US010018097B2

(12) United States Patent
Styles et al.

(10) Patent No.: US 10,018,097 B2
(45) Date of Patent: Jul. 10, 2018

(54) METHODS AND SYSTEMS FOR EXHAUST GAS HEAT RECOVERY

(71) Applicant: Ford Global Technologies, LLC, Dearborn, MI (US)

(72) Inventors: Daniel Joseph Styles, Canton, MI (US); Gregory Patrick McConville, Ann Arbor, MI (US); Karen Evelyn Bevan, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 146 days.

(21) Appl. No.: 15/053,827

(22) Filed: Feb. 25, 2016

(65) Prior Publication Data
US 2017/0248056 A1 Aug. 31, 2017

(51) Int. Cl.
*F01N 9/00* (2006.01)
*F02M 26/30* (2016.01)
*F02M 26/32* (2016.01)
*F01N 13/10* (2010.01)

(52) U.S. Cl.
CPC ............ *F01N 9/00* (2013.01); *F01N 13/107* (2013.01); *F02M 26/30* (2016.02); *F02M 26/32* (2016.02); *F01P 2037/02* (2013.01)

(58) Field of Classification Search
CPC ......... F01N 9/00; F01N 13/107; F02M 26/30; F02M 26/32; F01P 2037/02
USPC ........................................................ 701/108
See application file for complete search history.

(56) References Cited

U.S. PATENT DOCUMENTS

| 8,020,538 B2 | 9/2011 | Surnilla et al. |
| 8,069,663 B2 | 12/2011 | Ulrey et al. |
| 8,479,511 B2 | 7/2013 | Pursifull et al. |
| 8,511,084 B2 | 8/2013 | Ulrey et al. |
| 8,601,881 B2 | 12/2013 | Pirker |
| 8,661,815 B2 | 3/2014 | Ulrey et al. |
| 8,701,409 B2 | 4/2014 | Pursifull et al. |
| 8,997,464 B2 | 4/2015 | Santoso et al. |

(Continued)

OTHER PUBLICATIONS

Uhrich, Michael James et al., "Method and System for Exhaust Gas Heat Recovery," filed U.S. Appl. No. 15/010,382, filed Jan. 29, 2016, 70 pages.

(Continued)

*Primary Examiner* — Joseph Dallo
*Assistant Examiner* — Yi-Kai Wang
(74) *Attorney, Agent, or Firm* — Julia Voutyras; McCoy Russell LLP

(57) ABSTRACT

Methods and systems are provided for exhaust flow in an engine system including a split-exhaust manifold for expediting exhaust catalyst light-off and engine warm-up while reducing condensation in the engine system. In one example, a method may include, before exhaust catalyst light-off, flowing all or more exhaust gases, via a first exhaust valve and a first exhaust manifold, to an exhaust catalyst by passing a heat exchanger. Further, after light-off but before engine coolant warms up to a threshold temperature, all or more exhaust may be delivered to the heat exchanger, via a second exhaust valve and a second different manifold, prior to flowing to the exhaust catalyst; and exhaust gas recirculation may not be provided until the coolant reaches the threshold temperature to reduce condensation.

20 Claims, 10 Drawing Sheets

(56) References Cited

U.S. PATENT DOCUMENTS

| | | | | |
|---|---|---|---|---|
| 2001/0047798 A1* | 12/2001 | Kawasaki | ............... | F02M 26/16 |
| | | | | 123/568.12 |
| 2009/0101115 A1* | 4/2009 | Murase | ............... | F01L 1/34 |
| | | | | 123/491 |
| 2011/0072801 A1* | 3/2011 | Lupescu | ............... | F01N 3/031 |
| | | | | 60/287 |
| 2011/0126782 A1* | 6/2011 | Saele | ............... | B60H 1/025 |
| | | | | 123/41.1 |
| 2011/0139133 A1* | 6/2011 | Surnilla | ............... | F02D 41/0055 |
| | | | | 123/568.12 |
| 2012/0023935 A1* | 2/2012 | Pursifull | ............... | F02D 13/0207 |
| | | | | 60/605.2 |
| 2012/0180452 A1 | 7/2012 | Caine | | |
| 2013/0061579 A1* | 3/2013 | Kotrba | ............... | F01N 3/0256 |
| | | | | 60/295 |
| 2013/0098000 A1* | 4/2013 | Ruhland | ............... | F02D 13/00 |
| | | | | 60/273 |
| 2013/0174816 A1 | 7/2013 | Riley et al. | | |
| 2014/0134061 A1* | 5/2014 | Broderick | ............... | F23J 15/003 |
| | | | | 422/169 |
| 2014/0134661 A1* | 5/2014 | White | ............... | G01N 33/5008 |
| | | | | 435/29 |
| 2014/0158088 A1 | 6/2014 | Gehrke et al. | | |
| 2014/0325981 A1* | 11/2014 | Rabhi | ............... | F02B 37/164 |
| | | | | 60/600 |
| 2015/0121848 A1 | 5/2015 | Pursifull | | |
| 2015/0158367 A1* | 6/2015 | Jeong | ............... | B60H 1/00878 |
| | | | | 701/36 |
| 2015/0202571 A1* | 7/2015 | Cho | ............... | F23J 13/00 |
| | | | | 422/109 |

OTHER PUBLICATIONS

Styles, Daniel Joseph et al., "Method and System for Exhaust Gas Heat Recovery," U.S. Appl. No. 15/010,537: filed Jan. 29, 2016, 72 pages.

Uhrich, Michael James et al., "Exhaust Heat Recovery and Hydrocarbon Trapping," U.S. Appl. No. 15/010,688, filed Jan. 29, 2016, 53 pages.

* cited by examiner

METHODS AND SYSTEMS FOR EXHAUST GAS HEAT RECOVERY

FIELD

The present description relates generally to methods and systems for exhaust gas heat recovery at an exhaust gas heat exchanger.

BACKGROUND/SUMMARY

Engines may be configured with an exhaust heat recovery system for recovering heat of exhaust gas generated at an internal combustion engine. The heat is transferred from the hot exhaust gas to a coolant through an exhaust gas heat exchanger system. The heat from the coolant, circulated through the an exhaust gas heat exchanger, may be utilized for functions such as heating the cylinder head, and warming the passenger cabin, thereby improving engine efficiency and passenger comfort. In hybrid electric vehicles, the recovery of exhaust heat improves fuel economy by enabling engine temperatures to be maintained longer, thereby allowing for a faster engine shut-off and extended use of the vehicle in an electric mode.

Exhaust heat may also be retrieved at an exhaust gas recirculation (EGR) cooler. An EGR cooler may be coupled to an EGR delivery system to bring down the temperature of recirculated exhaust gas before it is delivered to the intake manifold. EGR may be used to reduce exhaust NOx emissions. Further, EGR may be used to assist in the reduction of throttling losses at low loads, and to improve knock tolerance.

Various approaches are provided for exhaust heat recovery and EGR cooling. In one example, a diverter valve is provided at a location upstream of an exhaust catalyst in an exhaust passage. During cold start, hot exhaust gases are diverted at the diverter valve via an EGR passage to an EGR cooler, where heat is transferred to the engine coolant. Subsequently, exhaust gases, after passing through the EGR cooler, are returned back to the exhaust passage at a location downstream of the diverter valve but upstream of the exhaust catalyst in the direction of exhaust flow.

However, the inventors herein have recognized potential disadvantages with the above approaches. As one example, it may be difficult to package the EGR passage, the diverter valve and the return tube prior to the exhaust catalyst. Further, during cold start condition, diverting exhaust to the EGR cooler may delay exhaust catalyst warm-up and hence, light-off. Still further, the diverter valve operates in an uncooled environment, which may cause durability issues.

The inventors herein have identified an approach by which the issues described above may be at least partly addressed. In one example, a method for an engine, comprises: during a cold start condition, before light-off of an exhaust catalyst, flowing exhaust drawn from a first exhaust valve of each engine cylinder to the exhaust catalyst while bypassing a heat exchanger; and after light-off of the exhaust catalyst, flowing exhaust drawn from a second exhaust valve of each engine cylinder to the heat exchanger, and transferring exhaust heat to an engine coolant at the heat exchanger. In this way, coolant warm-up may be achieved without delaying exhaust catalyst light-off. Thus, engine efficiency may be increased while engine emissions are reduced.

As one example, an engine system may be configured with a first exhaust manifold receiving exhaust from a first exhaust valve of each engine cylinder and a second exhaust manifold receiving exhaust from a second exhaust valve of each cylinder. Further, a heat exchanger may be included within the second exhaust manifold, and an EGR valve may be located downstream of the heat exchanger for regulating exhaust gas recirculation from downstream of the heat exchanger into an intake manifold. When an exhaust catalyst temperature is below a light-off temperature, exhaust may be drawn from the first exhaust valve and delivered to the exhaust catalyst via the first exhaust manifold bypassing the heat exchanger. After light-off, if an engine coolant temperature is below a threshold, exhaust may be drawn from the second exhaust valve and delivered to the heat exchanger, where exhaust heat is transferred to the engine coolant for warm-up. Further, when the engine coolant is below the threshold, in order to reduce exhaust gas condensation that may occur when exhaust gas hits cooler engine parts, EGR may not be provided. Therefore, during cold-start conditions, EGR valve may be closed and exhaust from downstream of the heat exchanger may be returned to the exhaust catalyst via a return passage.

In this way, by bypassing heat exchanger and delivering exhaust directly to the exhaust catalyst, catalyst light-off may be expedited. After catalyst light-off, by channeling exhaust gases directly to the heat exchanger, engine warm-up may also be expedited. Further, by not providing EGR until engine warm-up is achieved, condensation of exhaust gas may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
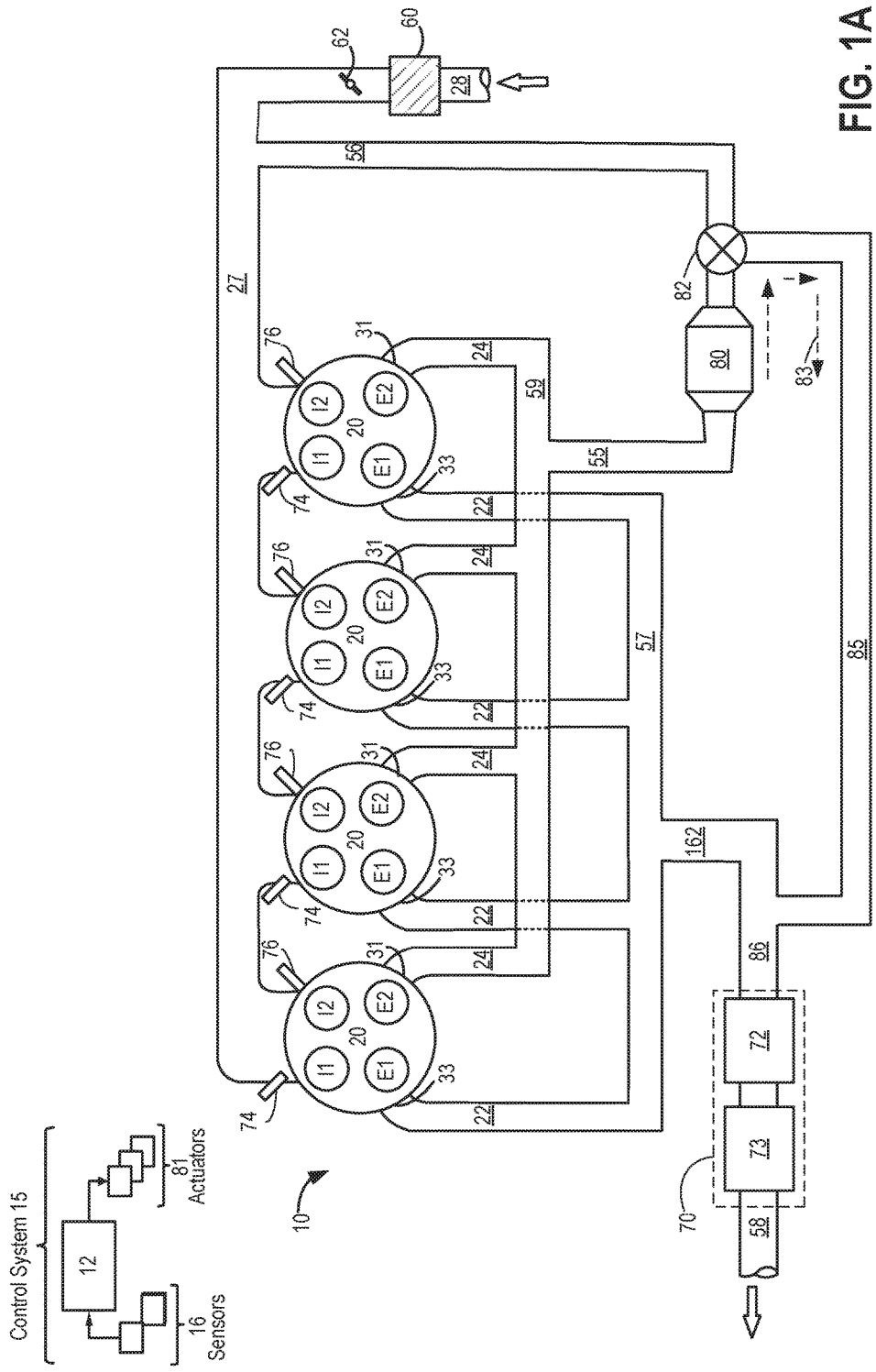
FIG. 1A shows a schematic depiction of a naturally aspirated engine system with a split exhaust manifold including a heat exchanger and an EGR valve configured as a variable valve according to an embodiment of the present disclosure.
Figure 1B:
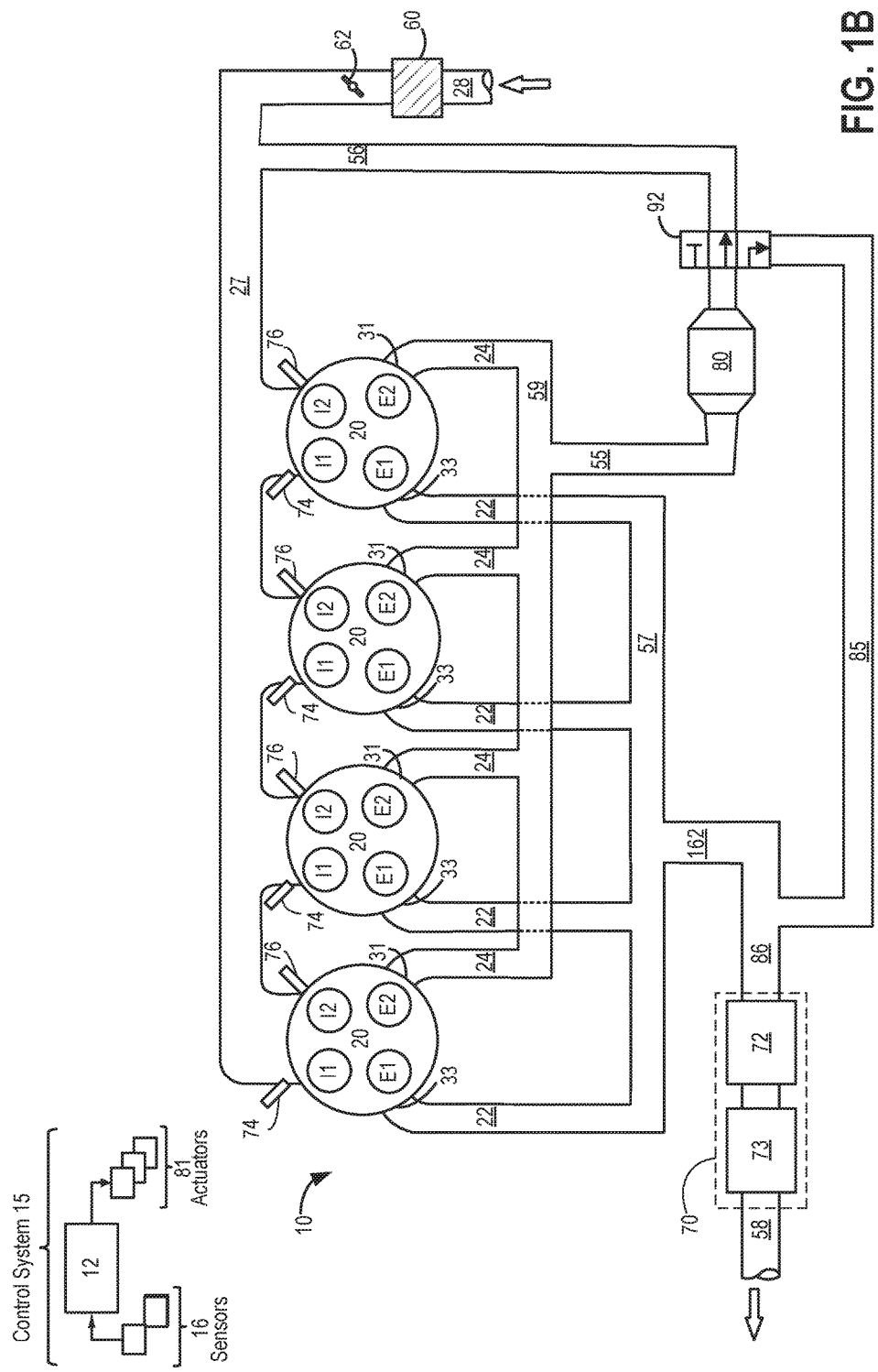
FIG. 1B shows a schematic depiction of a naturally aspirated engine system with a split exhaust manifold including a heat exchanger and an EGR valve configured as a three-position valve according to another embodiment of the present disclosure.
Figure 2:
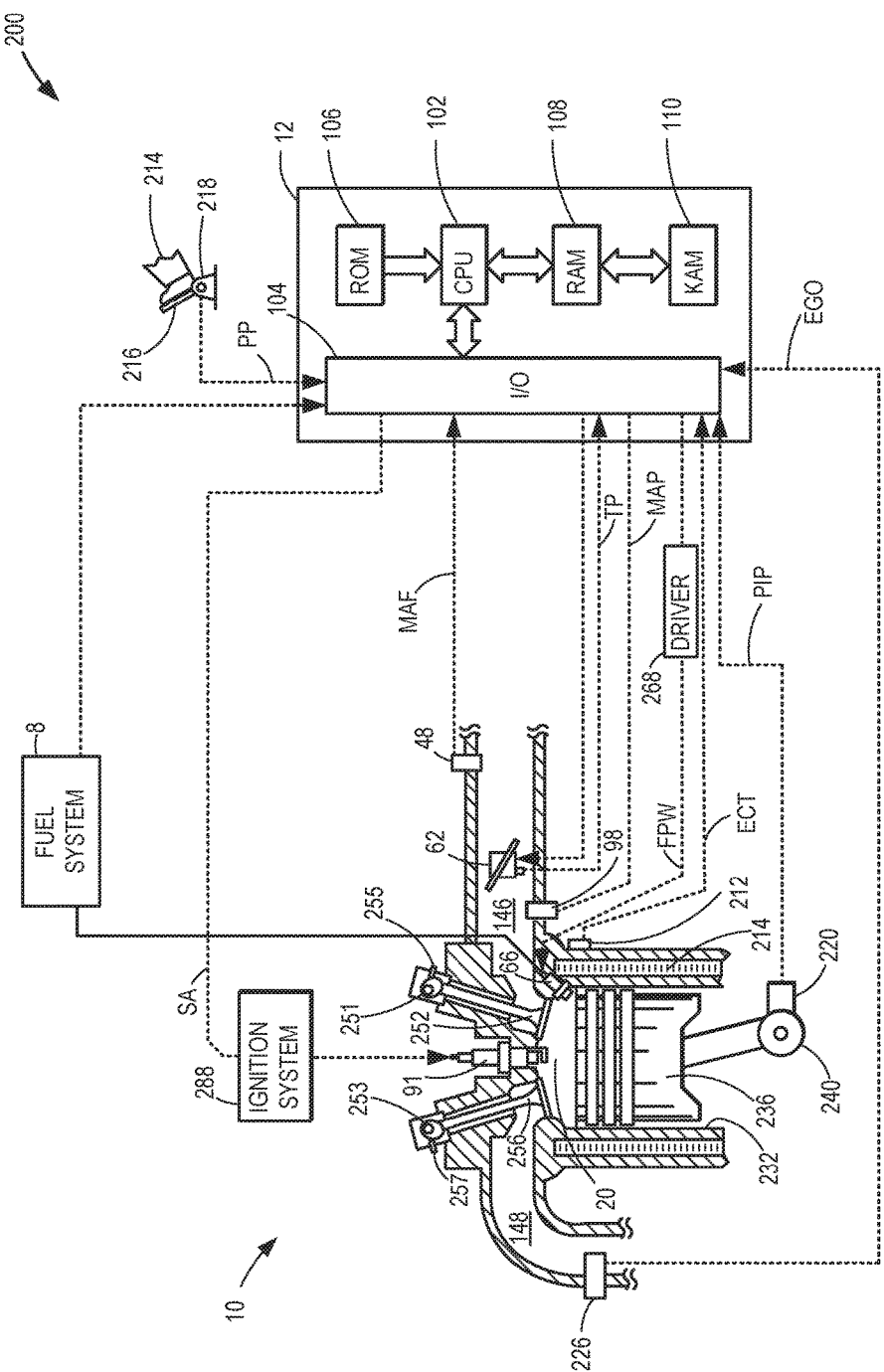
FIG. 2 shows a schematic depiction of a combustion chamber of the engine system of FIG. 1A or 1B.

The following description relates to systems and methods for controlling exhaust flow in an engine system including a split-exhaust manifold, such as the engine system of FIGS. 1A, 1B, and 2 in order to expedite exhaust catalyst light-off while improving engine warm-up and reducing exhaust gas condensation in the engine system. Specifically, before light-off and during cold-start conditions, all or majority of exhaust flow may be directed to the exhaust catalyst via a first exhaust valve of each engine cylinder and a first manifold for faster light-off and exhaust flow to a heat exchanger located within a second different exhaust manifold may be bypassed. After light-off, when an engine coolant temperature is below a threshold, all or majority of exhaust flow may be directed to the heat via a second exhaust valve of each engine cylinder and the second manifold for faster coolant warm-up, and the cooled exhaust from the heat exchanger may be subsequently returned to the exhaust catalyst. Further, until the engine temperature reached the threshold, exhaust gas recirculation may not be provided in order to reduce exhaust gas condensation within the engine system and the exhaust gas recirculation system. An engine controller may be configured to perform a control routine, such as the example routines of FIGS. 3-6, to vary the position of the system valve(s) to adjust exhaust flow through the split-exhaust system in the systems of FIGS. 1A, 1B, and 2, respectively. Example operations of the systems of FIGS. 1A, 1B, and 2 are shown with reference to FIGS. 7-9 respectively.

FIG. 1A shows a schematic diagram of a multi-cylinder internal combustion engine 10, which may be included in a propulsion system of an automobile. Engine 10 may include a plurality of combustion chambers (that is, cylinders) 20. In the depicted example, engine 10 includes four cylinders arranged in an in-line configuration. However, in alternate examples, engine 10 can include two or more cylinders such as 3, 5, 8, 10 or more cylinders, arranged in alternate configurations, such as V-6, I-6, V-12, opposed 4, boxed, etc.

Each cylinder 20 of engine 10 may be configured to receive intake air from an intake manifold 27 via an air intake passage 28. Intake passage 28 may include an air intake throttle 62 downstream of an air filter 60. The position of throttle 62 can be adjusted by control system 15 via a throttle actuator (not shown) communicatively coupled to controller 12. By modulating throttle 62, an amount of fresh air may be inducted from the atmosphere into engine 10 and delivered to the engine cylinders at or below barometric (or atmospheric) pressure via intake passage 28. Intake manifold 27 may be coupled to the combustion chambers via intake ports (not shown). Each intake port may supply air and/or fuel to the cylinder it is coupled to for combustion.

Each cylinder intake port can selectively communicate with the cylinder via one or more intake valves. In the depicted example, each cylinder 20 is shown with two intake valves I1 and I2. In one example, an intake passage may be formed from intake manifold 27 selectively communicating with each intake valve. In other embodiments, an intake passage for a single cylinder may be split close to the cylinder into two adjacent paths with a wall in-between, each split path of the passage communicating with a single intake valve. In another example, each of the two intake valves may be controlled to open at specific engine speeds and therefore, may communicate through a common intake port with the intake manifold.

Each combustion chamber may exhaust combustion gases via two exhaust ports coupled thereto. In the depicted example, each cylinder 20 is coupled to a first exhaust port 33 via a first exhaust valve E1, and to a second exhaust port 31 via a second exhaust valve E2. Each exhaust port of each cylinder may lead to different exhaust manifolds for channeling a portion of exhaust gas. In some embodiments, the lift profiles for the first and second valves may be different to direct a first portion of exhaust gas (also herein referred to as blowdown portion) and a second latter portion (also referred to as scavenging portion) to separate manifolds. For example, each of the first exhaust ports 33 from each of the cylinders 20 may combine into a first exhaust manifold 57 via runners 22. Similarly, each of the second exhaust ports 31 from each of the cylinders 20 may combine into a second exhaust manifold 59 via runners 24. In this way, each combustion chamber 20 may exhaust combustion gases (herein also referred to as exhaust gases) into first exhaust manifold 57 via first exhaust valve E1 and into second exhaust manifold 57 via second exhaust valve. Such an exhaust system including two exhaust manifolds, one manifold for conducting a portion of the exhaust, and the other manifold for conducting a remaining portion of the exhaust will be referred to herein as the "split exhaust system".

Engine 10 may include an exhaust after treatment system 70 within a common exhaust passage. Exhaust after treatment system may include a first emission control device 72 and a second emission control device 73. In some examples, emission control device 72 may be a three-way type catalyst. In other examples, first emission control device 72 may include one or more of a plurality of a diesel oxidation catalyst (DOC), and a selective catalytic reduction catalyst (SCR). Similarly, second emission control device 73 may be a three-way type catalyst. In some examples, second emission control device may include one or more of a plurality of a diesel oxidation catalyst (DOC), and a selective catalytic reduction catalyst (SCR). Further, first and second emission control devices 72 and 73 can each include multiple catalyst bricks, in one example. In another example, first and second emission control devices 72 and 73 can each include multiple emission control devices, each with multiple brick.

Exhaust gases may flow from each cylinder 10 to the first exhaust runners 22 via first exhaust valve E1, and subsequently flow to first exhaust manifold 57 and a first exhaust passage 162 before flowing to exhaust after treatment system 70 in common exhaust passage 86. Thus, exhaust gases from each cylinder 20 may be delivered to exhaust after treatment system 70 via each first exhaust valve E1, first exhaust runners 22, first exhaust manifold 57, first exhaust passage 162 and common exhaust passage 86. After passing through exhaust after treatment system 70, exhaust gas may be directed out to a tailpipe 58.

Engine 10 may also include a heat exchanger 80 located within a second passage 55 coupled to the second exhaust manifold 59. A coolant may be circulated through heat exchanger 80 for effective cooling of the exhaust gas passing through it, before the gas either enters an EGR passage 56 or escapes to the atmosphere via a return passage 85, common passage 86, exhaust after treatment system 70, and tail pipe 58. Combustion gases from each cylinder 20 may be delivered to heat exchanger 80 via second exhaust valve E2 of each cylinder, exhaust runners 24, second exhaust manifold 59 and second exhaust passage 55. Further, an exhaust gas recirculation (EGR) valve 82 may be located downstream of heat exchanger 80 (downstream with respect to direction of exhaust flow) to regulate the flow of exhaust though the EGR passage 56 and the heat exchanger 80. EGR valve 82 may be opened to admit a controlled amount of exhaust gas to intake manifold 27 for desirable combustion and emissions control performance.

In one embodiment, as depicted in FIG. 1A, EGR valve 82 may be configured as a continuously variable valve for metering an amount of exhaust gas recirculation flow into intake manifold. When EGR valve 82 is configured as a variable valve, a portion of exhaust gas may flow from heat exchanger 80 to a return passage 85 (as indicated by arrows 83) in all positions of EGR valve 82. In some examples, valve 82 may include two separate valves including an on/off valve to block or allow the flow of exhaust gas to passage 85 followed by a variable valve, downstream of the on/off valve in the direction of exhaust flow from second exhaust valves E2 to heat exchanger 86, to regulate flow of exhaust gasses to passage 56.

A second embodiment of EGR valve 82 is illustrated at FIG. 1B. Turning to FIG. 1B, a naturally aspirated engine system with a split exhaust manifold including a heat exchanger and an EGR valve configured as a three-position valve is shown. Many of the elements of FIG. 1B correspond to similarly numbered elements already described above for FIG. 1A; such elements will not be described again for the sake of brevity.

As indicated at FIG. 1B, rather than a variable EGR valve, an EGR valve 92 configured as a three-position valve may be positioned downstream of heat exchanger 80. Specifically, when valve operation of each cylinder 20 is adjusted via one or more valve actuators (not shown) such that first exhaust valve E1 opens at a first timing and second exhaust valve E2 opens at a second, different timing, the second timing of second exhaust valve E2 may be adjusted to regulate an amount of exhaust recirculation flow. In such cases, when the second timing is utilized for metering exhaust gas recirculation flow, EGR valve 92 may be configured as a three-position valve movable between a first position, a second position, and a third position allowing for selection of different pathways for exhaust gas flow. In the first position, EGR valve 92 may allow all of exhaust gases from heat exchanger 80 to flow to the exhaust recirculation passage 56 and subsequently to the intake manifold 27. The present example shows EGR valve 92 in the first position. In the second position, EGR valve 92 may allow all of exhaust gases from heat exchanger 80 to flow to return passage 85 and subsequently to exhaust after treatment system 70. In the third position, the EGR valve 92 may block flow of exhaust gases from heat exchanger 80 to both the exhaust recirculation passage 56 and return passage 85. As such, a valve actuator (not shown) may be utilized for adjusting a position of the EGR valve to the first, second or third positions based on signals received from a controller 12. Alternately, valve 92 may be configured as two separate valves including a first on/off valve to block or allow the flow of exhaust gas to passage 85 followed by a second on/off valve (that is, second on/off valve downstream of first on/off valve in the direction of exhaust flow from exhaust valves E2 to heat exchanger 80) to block or allow the flow of gasses to passage 56. As such, a first valve actuator (not shown) may be utilized for opening or closing the first on/off valve and a second valve actuator may be utilized for opening or closing the second on/off valve.

Returning to FIG. 1A, as discussed above, exhaust gases from each cylinder 20 may be delivered to the heat exchanger 80 via exhaust valves E2, runners 24, second exhaust manifold 59 and second exhaust passage 55, and then delivered from the heat exchanger 80 to either the intake manifold 27 and/or exhaust after treatment system based on a position of the EGR valve. Exhaust gases may also flow from each cylinder 20 to exhaust after treatment system 70 bypassing the heat exchanger 80 via first exhaust valves E1, exhaust runners 22, first exhaust manifold 57, first exhaust passage and common passage 86. Operation of exhaust valves E1 and E2 may be adjusted to flow all of the exhaust via exhaust valves E1 alone, or flow all of the exhaust via exhaust valves E2, or flow a portion of the exhaust via exhaust valves E1 and a remaining portion of the exhaust via exhaust valves E2 based on engine operating conditions. Details of adjusting exhaust valve operation will be further elaborated with respect to FIGS. 3-9.

In this way, combusted gases exiting a cylinder may be separated into two parts via two distinct exhaust passages formed by the split exhaust manifold. For example, in one combustion cycle, first exhaust valve E1 of cylinder 20 may channel a first portion of the exhaust to exhaust after treatment system 70 via first exhaust valve E1 and first exhaust passage 162, and a second exhaust valve E2 of the same cylinder (20) may direct a second portion of exhaust gases to heat exchanger 80 via the second passage 55.

Each cylinder 20 is shown coupled with two injectors 74 and 76 per cylinder. Fuel injectors 76 are shown coupled directly to each cylinder for injecting fuel directly therein in proportion to a pulse width of signal FPW-1 received from controller 12 via an electronic driver. In this manner, fuel injector 76 provides what is known as direct injection (hereafter referred to as "DI") of fuel into cylinder 20. While FIGS. 1A and 1B shows injector 76 positioned to one side of cylinder 20, it may alternatively be located overhead of a piston, such as near a position of a spark plug. Such a position may improve mixing and combustion when operating the engine with an alcohol-based fuel due to the lower volatility of some alcohol-based fuels. Alternatively, the injector 76 may be located overhead and near the intake valve to improve mixing.

Fuel injectors 74 are shown arranged in intake air passage 27, rather than in cylinder 20, in a configuration that provides what is known as port injection of fuel (hereafter referred to as "PFI") into the intake port upstream of cylinder 20. Fuel injector 74 may inject fuel, received from a fuel system, in proportion to a pulse width of signal FPW-2 received from controller 12 via a second electronic driver. Note that a single electronic driver may be used for both fuel injection systems, or multiple drivers may be used.

In an alternate example, each of fuel injectors 74 and 76 may be configured as direct fuel injectors for injecting fuel directly into cylinder 20. In still another example, each of fuel injectors 74 and 76 may be configured as port fuel injectors for injecting fuel upstream of intake valves I1 and I2. Though not shown in FIGS. 1A and 1B, fuel may be delivered to the fuel injectors by a fuel system including a fuel tank, a fuel pump, a fuel line, and a fuel rail.

In some examples, a distributorless ignition system (not shown) may provide an ignition spark to spark plugs (not shown) coupled to combustion chambers 20 in response to controller 12.

Engine 10 may be controlled at least partially by a control system 15 including controller 12 and by input from a vehicle operator via an input device (not shown). Control system 15 is shown receiving information from a plurality of sensors 16 (various examples of which are described herein) and sending control signals to a plurality of actuators 81. As one example, sensors 16 may include air inlet pressure and temperature sensors, and manifold air pressure (MAP) sensors located within the intake passage. Other sensors may include a throttle inlet pressure (TIP) sensor for estimating a throttle inlet pressure (TIP) and/or a throttle inlet temperature sensor for estimating a throttle air temperature (TCT) coupled downstream of the throttle in the intake passage. Additional system sensors and actuators are elaborated below with reference to FIG. 2. As another example, actuators 81 may include fuel injectors, and throttle 62. Controller 12 may receive input data from the various sensors, process the input data, and trigger the actuators in response to the processed input data based on instruction or code programmed therein corresponding to one or more routines. Example control routines are described herein with respect to FIGS. 3-6, which are carried out through interactions with the various components represented in FIGS. 1-2.

Referring to FIG. 2, it depicts a partial view 200 of a single cylinder of internal combustion engine 10. As such, components previously introduced in FIG. 1A are represented with the same reference numbers and are not re-introduced, and in one example FIGS. 1A and 2, or FIGS. 1B and 2, may be combined as a common example configuration, such that components described with regard to FIG. 2 also may refer to the system of FIG. 1A or 1B.

Engine 10 is depicted with combustion chamber (cylinder) 20, coolant sleeve 214, and cylinder walls 232 with piston 236 positioned therein and connected to crankshaft 240. Combustion chamber 20 is shown communicating with intake passage 146 and exhaust passage 148 via respective intake valve 252 and exhaust valve 256. As previously described in FIG. 1A, each cylinder of engine 10 may exhaust combustion products along two conduits. In the depicted view 200, exhaust passage 148 represents the first exhaust port leading from the cylinder to the turbine (such as exhaust port 33 of FIGS. 1A and 1B) while the second exhaust conduit leading to the exhaust catalyst is not visible in this view.

As also previously elaborated in FIG. 1A, each cylinder of engine 10 may include two (or more) intake valves and two (or more) exhaust valves. In the depicted view 200, intake valve 252 and exhaust valve 256 are located at an upper region of combustion chamber 20. Intake valve 252 and exhaust valve 256 may be controlled by controller 12 using respective cam actuation systems including one or more cams. The cam actuation systems may utilize one or more of cam profile switching (CPS), variable cam timing (VCT), variable valve timing (VVT) and/or variable valve lift (VVL) systems to vary valve operation. In the depicted example, each intake valve 252 is controlled by an intake cam 251 and each exhaust valve 256 is controlled by an exhaust cam 253. The position of intake valve 252 and exhaust valve 256 may be determined by valve position sensors 255 and 257, respectively.

In alternate embodiments, the intake and/or exhaust valve may be controlled by electric valve actuation. For example, cylinder 20 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

In one example, intake cam 251 includes separate and different cam lobes that provide different valve profiles (e.g., valve timing, valve lift, duration, etc.) for each of the two intake valves of combustion chamber 20. Likewise, exhaust cam 253 may include separate and different cam lobes that provide different valve profiles (e.g., valve timing, valve lift, duration, etc.) for each of the two exhaust valves of combustion chamber 20. In another example, intake cam 251 may include a common lobe, or similar lobes, that provide a substantially similar valve profile for each of the two intake valves.

In addition, different cam profiles for the different exhaust valves can be used to separate exhaust gases exhausted at low cylinder pressure from exhaust gases exhausted at exhaust pressure. For example, a first exhaust cam profile can open from closed position the first exhaust valve just before BDC (bottom dead center) of the power stroke of combustion chamber 20 and close the same exhaust valve well before top dead center (TDC) to selectively exhaust blowdown gases from the combustion chamber. Further, a second exhaust cam profile can be positioned to open from closed position a second exhaust valve at about the mid-point of the exhaust stroke and close it before TDC to selectively exhaust the scavenging portion of the exhaust gases.

Continuing with FIG. 2, exhaust gas sensor 226 is shown coupled to exhaust passage 148. Sensor 226 may be positioned in the exhaust passage upstream of one or more emission control devices, such as device 72 of FIGS. 1A and 1B. Sensor 226 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. The downstream emission control devices may include one or more of a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Cylinder 20 can have a compression ratio, which is the ratio of volumes when piston 236 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 91 for initiating combustion. Ignition system 288 can provide an ignition spark to combustion chamber 20 via spark plug 91 in response to spark advance signal SA from controller 12, under select operating modes. However, in some embodiments, spark plug 91 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 20 is shown including one fuel injector 66. Fuel injector 66 is shown coupled directly to combustion chamber 20 for injecting fuel directly therein in proportion to the pulse width of signal FPW received from controller 12 via electronic driver 268. In this manner, fuel injector 66 provides what is known as direct injection (hereafter also referred to as "DI") of fuel into combustion cylinder 20. While FIG. 2 shows injector 66 as a side injector, it may also be located overhead of the piston, such as near the position of spark plug 91. Such a position may improve mixing and combustion when operating the engine with an alcohol-based fuel due to the lower volatility of some alcohol-based fuels. Alternatively, the injector may be located overhead and near the intake valve to improve mixing. In an alternate embodiment, injector 66 may be a port injector providing fuel into the intake port upstream of cylinder 20.

Fuel may be delivered to fuel injector 66 from a fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a fuel system is used. Further, while not shown, the fuel tanks may have a pressure transducer providing a signal to controller 12. Fuel tanks in fuel system 8 may hold fuel with different fuel qualities, such as different fuel compositions. These differences may include different alcohol content, different octane, different heat of vaporizations, different fuel blends, and/or combinations thereof etc. In some embodiments, fuel system 8 may be coupled to a fuel vapor recovery system including a canister for storing refueling and diurnal fuel vapors. The fuel vapors may be purged from the canister to the engine cylinders during engine operation when purge conditions are met. For example, the purge vapors may be naturally aspirated into the cylinder via the first intake passage at or below barometric pressure.

Controller 12 is shown in FIG. 2 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 48; exhaust catalyst temperature from an exhaust catalyst temperature sensor within the exhaust catalyst (not shown), engine coolant temperature (ECT) from temperature sensor 212 coupled to coolant sleeve 214; a profile ignition pickup signal (PIP) from Hall effect sensor 220 (or other type) coupled to crankshaft 240; throttle position (TP) from a throttle position sensor; absolute manifold pressure signal (MAP) from sensor 98, cylinder AFR from EGO sensor 226, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 66, throttle 62, spark plug 91, intake/exhaust valves and cams, EGR valve actuator, etc. The controller may receive input data from the various sensors, process the input data, and trigger the actuators in response to the processed input data based on instruction or code programmed therein corresponding to one or more routines. Example control routines will be described later with regard to FIGS. 3-6.

Figure 3:
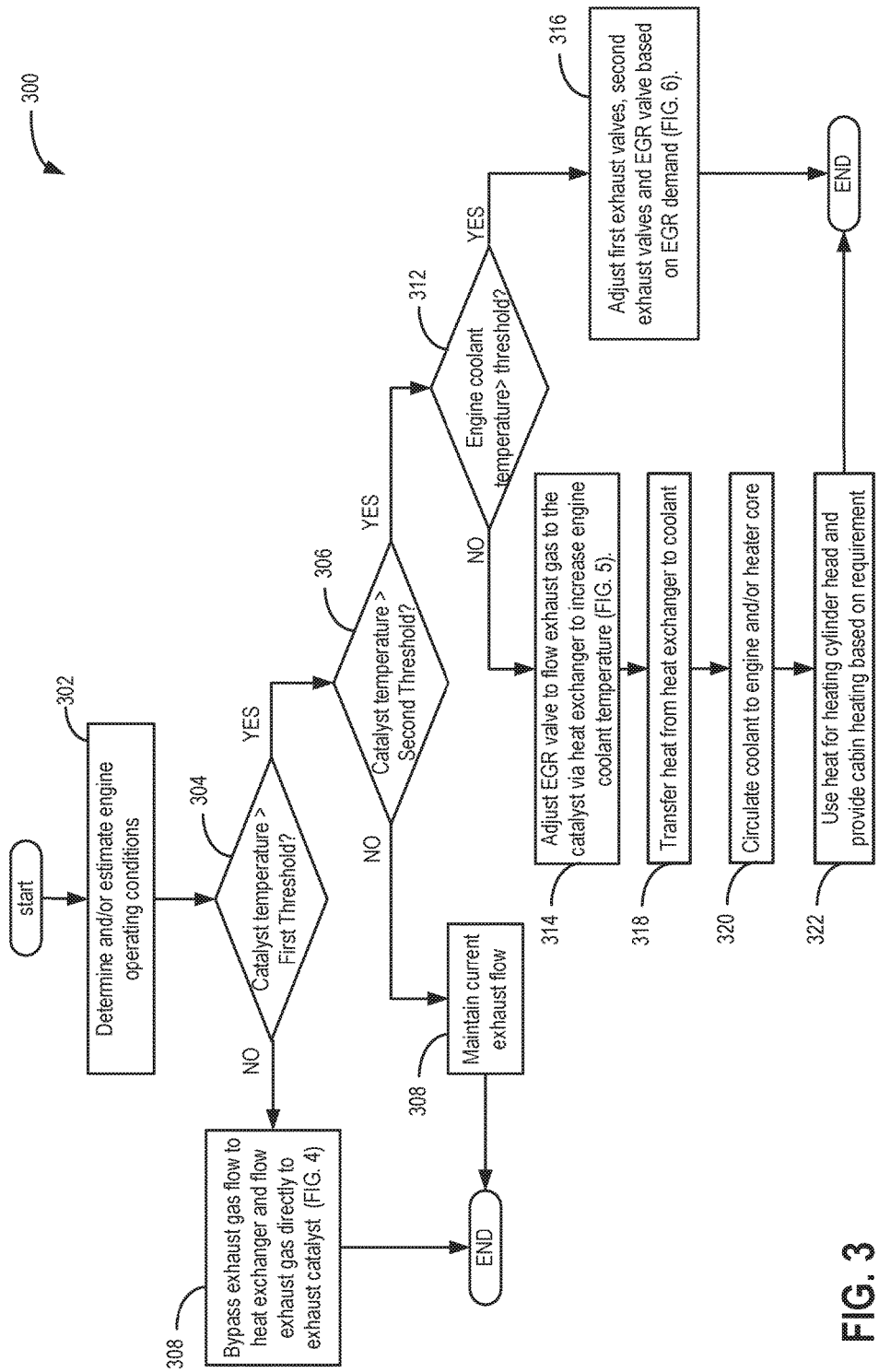
FIG. 3 shows a flow chart illustrating an example method that may be implemented for controlling exhaust flow through a split exhaust manifold based on engine operating conditions.

FIG. 3 illustrates an example method 300 that may be implemented for adjusting exhaust flow through the exhaust bypass assembly of FIG. 1A or 1B. Instructions for carrying out method 300 and the rest of the methods included herein may be executed by a controller based on instructions stored on a memory of the controller and in conjunction with signals received from sensors of the engine system, such as the sensors described above with reference to FIGS. 1A, 1B, and 2. The controller may employ engine actuators of the engine system to adjust engine operation, according to the methods described below.

At 302, method 300 includes estimating and/or measuring current engine operating conditions. Conditions assessed may include, for example, exhaust catalyst temperature, engine coolant temperature, engine load, engine speed, manifold vacuum, throttle position, exhaust pressure, etc.

At 304, method 300 includes determining if a first temperature of a first exhaust catalyst, such as first emission control device 72 at FIG. 1A or 1B, is greater than a first threshold. The first temperature of the first exhaust catalyst may be below the first threshold when the vehicle engine is operating under cold start conditions, for example.

If it is confirmed that the first temperature is not greater than the first threshold, method 300 proceeds to 308. At 308, method 300 includes bypassing exhaust flow to a heat exchanger, such as heat exchanger 80 at FIG. 1A or 1B, and delivering the exhaust gas directly to the exhaust catalyst via a first exhaust manifold, such as first exhaust manifold 57 at FIG. 1A or 1B. Therefore, when the first temperature of the first exhaust catalyst is less than the first threshold, by delivering exhaust gas directly to the first exhaust catalyst, exhaust catalyst heating may be expedited. In order to allow the exhaust gases to bypass the heat exchanger and deliver the exhaust gases to the exhaust after treatment assembly, operation of a first exhaust valve of each engine cylinder and a second exhaust valve of each cylinder may be adjusted. Details of adjusting the first exhaust valve and the second exhaust valve of each cylinder will be further elaborated with respect to FIG. 4.

If it is confirmed that the first temperature is at or above the first threshold (that is, if the answer at 304 is YES), method 300 proceeds to 306. At 306, method 300 includes determining if the first temperature of the first exhaust catalyst is greater than a second threshold temperature. In one example, the second threshold temperature may be a light-off temperature at which the first exhaust catalyst light-off occurs. Light-off temperature may be a temperature at which the catalytic reactions of the catalyst are sufficiently operating, for example at greater than 75% efficiency, for example. If the first temperature is not greater than the second threshold but remains at or above the first threshold temperature, method 300 proceeds to 308. At 308, method 300 includes maintaining current exhaust flow. The current exhaust flow may be the exhaust flow at a latest time point before the first temperature reached the first threshold temperature or a latest time point before the first temperature decreased below the second threshold temperature. Maintaining current exhaust flow includes maintaining a current engine valve operation. The current engine valve operation may be the engine valve operation at a latest time point before the first temperature reached the first threshold temperature or a latest time point before the first temperature decreased below the second threshold temperature. For example, if the first exhaust temperature increased from a latest temperature below the first threshold to a current temperature at the first threshold, exhaust flow at the latest temperature below the first threshold may be maintained. Thus, exhaust gases may continue to be delivered to the first exhaust catalyst while bypassing the heat exchanger. However, if the first exhaust temperature decreased from a latest temperature above the second threshold temperature to a current temperature below the second threshold temperature, exhaust flow at the latest temperature above the second threshold temperature may be maintained.

If it is determined that the first temperature is greater than the second threshold, method 300 proceeds to 312. At 312, method 300 includes determining if an engine coolant temperature is greater than a threshold coolant temperature. In one example, the engine coolant temperature may be determined based on a cylinder head temperature obtained from a temperature sensor within the cylinder head. In another example, the engine coolant temperature may be determined based on an indication from a temperature sensor located within a coolant circuit.

If it is confirmed that the engine coolant temperature is less than the threshold coolant temperature, method 300 proceeds to 314. The threshold coolant temperature may be based on one or more of a cabin heating demand, desired cylinder head temperature, etc. Accordingly, as the cabin heating demand increases, the threshold coolant temperature may be greater. At 314, responsive to the first temperature above the second threshold (after exhaust catalyst light-off has occurred) and the engine coolant temperature below the threshold coolant temperature, method 300 includes adjusting an EGR valve, such as EGR valve 82 at FIG. 1A or EGR valve 92 at FIG. 1B, and delivering exhaust gas to the first exhaust catalyst via the heat exchanger. For example, when the EGR valve is configured as variable EGR valve 82, the EGR valve may be closed. However, when the EGR valve is configured as EGR valve 92 (that is, when EGR valve is configured as a three-position valve), the EGR valve may be adjusted to the second position discussed above with respect to FIG. 1B. In either case, the EGR valve may be adjusted such that exhaust gas may be delivered to the exhaust catalyst via heat exchanger and a return passage, such as passage 85 at FIG. 1.

By flowing exhaust gas through the heat exchanger prior to delivering the exhaust gas to the first exhaust catalyst, majority of heat from the exhaust gas can be transferred to the engine coolant via the heat exchanger. Further, by closing the EGR valve until the engine has warmed up to the desired temperature (that is, until engine coolant temperature has reached the threshold temperature), condensation of exhaust gases in the intake manifold and in the exhaust gas recirculation loop downstream of the heat exchanger including the EGR valve and the EGR passage between the heat exchanger and the intake manifold may be reduced. In order to deliver exhaust gas to the first exhaust catalyst via the heat exchanger, operation of the first exhaust valve of each engine cylinder and the second exhaust valve of each cylinder may be adjusted. Details of adjusting the first exhaust valve, the second exhaust valve, and the EGR valve for coolant warm-up and for reducing condensation will be further elaborated with respect to FIG. 5.

Next, method 300 may proceed from 314 to 318. At 318, waste heat is recovered at the heat exchanger. Specifically, heat from the exhaust gas is transferred to a coolant circulating through the heat exchanger. By transferring the heat from the exhaust gas to the coolant, at a location downstream of the exhaust catalyst, exhaust heat remaining after heating the exhaust catalyst can be advantageously used to warm the coolant circulating through the heat exchanger. As a result, the exhaust gas leaving the heat exchanger is cooled down.

Next, at 320, the coolant warmed via heat transfer at the heat exchanger may be circulated to the engine and/or a heater core by a coolant pump so that it can be utilized for heating other components of the vehicle during the engine cold-start, such as a cylinder head, an engine block, and a vehicle cabin space.

At 322, method 300 includes transferring heat from the coolant to one or more vehicle components based on vehicle heating demands. In case of the cold start, the vehicle cabin temperature may be low and cabin heating may be required. Thus, based on cabin heating demand, as requested by a vehicle operator (e.g., based on a cabin temperature setting), heat may be transferred from the coolant to the cabin via the heater core. For example, air may be drawn into the cabin via the heater core, thereby enabling the cabin to be warmed. While meeting the cabin heating demand, the warmed coolant may also be circulated to an engine block and cylinder head to raise engine temperatures, thereby improving engine performance during cold conditions.

Returning to 312, if it is determined that the engine coolant temperature is greater than or equal to the threshold coolant temperature, method 300 proceeds to 316. At 316, method 300 includes flowing exhaust gas through heat exchanger based on EGR demand. Specifically, operation of the first exhaust valve of each engine cylinder, the second exhaust valve of each cylinder, and the EGR valve may be adjusted based on EGR demand so that exhaust gas flows through the heat exchanger only when there is EGR demand. If EGR is not desired, exhaust flow may by pass the heat exchanger so that further increase in coolant temperature is reduced. Details adjusting the first exhaust valves, the second exhaust valves, and the EGR valve based on EGR demand when the coolant temperature is greater than the threshold will be further elaborated with respect to FIG. 6.

In this way, by adjusting exhaust gas flow to bypass or flow through the heat exchanger before delivering to the intake or the exhaust catalyst based on exhaust catalyst temperature and engine coolant temperature, faster light-off may be achieved while achieving faster coolant warm-up and reducing condensation.

In some examples, exhaust flow may be adjusted based on more than one coolant temperature threshold. For example, a first threshold coolant temperature determined based on a desired cylinder head temperature and a second threshold coolant temperature based on the desired cylinder head temperature and vehicle cabin heating requirements may be utilized. The second threshold may be greater than the first threshold. The second threshold may also vary based on cabin heating requirements. In some examples, the first and the second threshold may be the same (e.g., when there is no cabin heating requirement). When the coolant temperature is less than the first threshold, EGR may not be provided to reduce condensation and all or more exhaust gases may be delivered to the heat exchanger before flowing to the exhaust catalyst for faster coolant warm-up. When the coolant temperature is at or above the first threshold but below the second threshold, EGR may be provided based on desired EGR flow, thereby increasing the range of EGR operation. Further, exhaust gases may be delivered to the heat exchanger to meet the cabin heating requirements. Thus, all or more exhaust gases may be delivered to the heat exchanger (for example, deactivating the first exhaust valves, or advancing the timings of the first exhaust valves, or increasing the first exhaust valve lift) and based on EGR demand, cooler exhaust gases may be delivered to the intake manifold via the EGR valve. The remaining exhaust gases may be delivered from the heat exchanger to the exhaust catalyst via the return passage. When the coolant temperature is at or above the second threshold coolant temperature, when the desired EGR flow is zero, all or majority of the exhaust gases may be delivered to the exhaust catalyst bypassing the heat exchanger (for example, deactivating the second exhaust valves, or retarding the timings of the second exhaust valves, or reducing the second exhaust valve lift) in order to reduce excessive increase in coolant temperature. If the desired EGR flow is greater than zero when the coolant temperature is at or above the second threshold coolant temperature, exhaust flow to the heat exchanger may be based on EGR demand while remaining exhaust flow from the cylinders may be delivered to the exhaust catalyst bypassing the heat exchanger.

Figure 4:
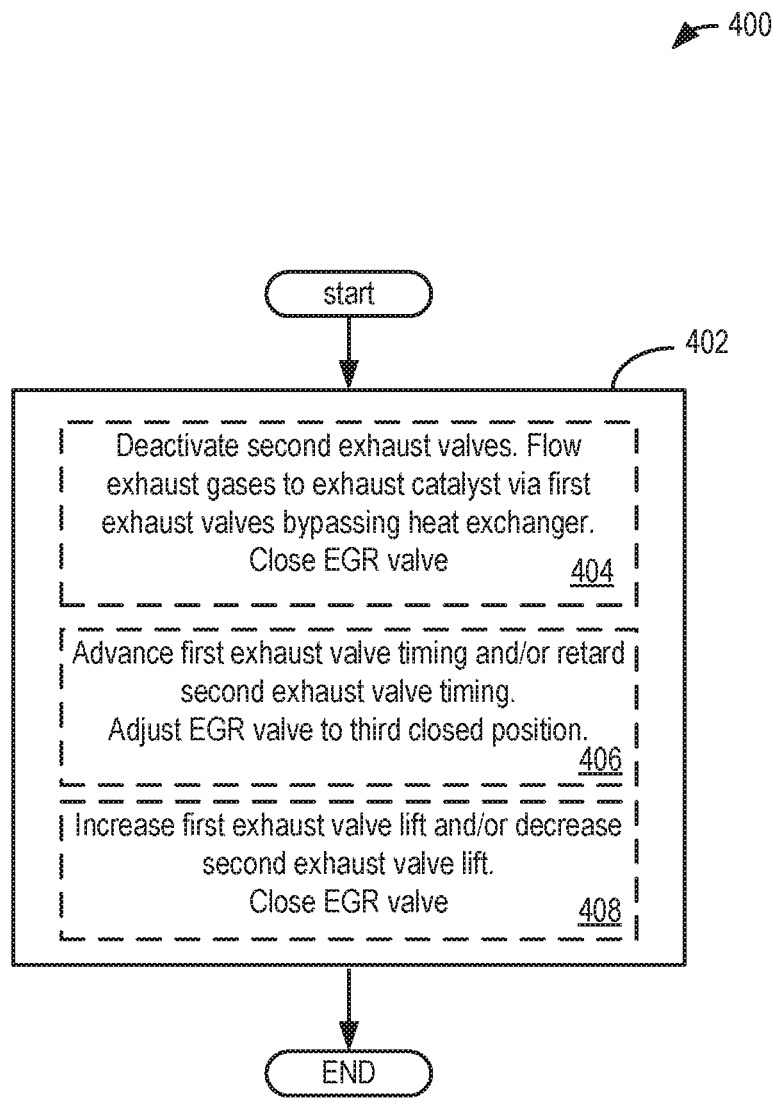
FIG. 4 shows a flow chart illustrating an example method that may be implemented for increasing exhaust flow to a first exhaust catalyst, to be used in conjunction with FIG. 3.

Turning to FIG. 4, a flow chart illustrating an example method 400 for operating the first exhaust valve of each cylinder, the second exhaust valve of each cylinder, and the EGR valve to expedite exhaust catalyst light-off is shown. Method 400 may be performed by a controller, such as controller 12 at FIG. 1A or 1B, in coordination with method 300 described at FIG. 3. Specifically, method 400 may be performed responsive to an exhaust catalyst temperature less than a first temperature threshold. As such, the controller may adjust one or more actuators according to the method described below based on signals received from one or more sensors of the vehicle system. For example, based on an indication from an exhaust catalyst temperature sensor located within an exhaust catalyst, the controller may adjust an exhaust valve cam actuation system including one or more exhaust valve cams (e.g., exhaust cam 253 at FIG. 2) to vary valve operation to control flow of exhaust gases. The controller may utilize one or more cam profile switching (CPS), variable cam timing (VCT), variable valve timing (VVT) and/or variable valve lift (VVL) systems to vary valve operation.

At 402, method 400 includes adjusting first exhaust valves, second exhaust valves, and the EGR valve to bypass exhaust flow to the heat exchanger and flowing exhaust gas to the exhaust catalyst via the first exhaust manifold. Accordingly, in a first embodiment of method 400, as indicated at 404, method 400 includes deactivating the second exhaust valve and maintaining the first exhaust valve active. Thus, during an exhaust phase of a cylinder cycle, the controller may operate the exhaust cam actuation system to open the first exhaust valve that delivers exhaust gas to the first exhaust manifold and close the second exhaust valve that delivers exhaust gas to the second exhaust manifold. By deactivating the second exhaust valves, all of the exhaust gases generated during cylinder combustion are delivered to the exhaust after treatment system via the first exhaust valves and the first exhaust manifold. Thus, exhaust gas is not flown through the heat exchanger when the exhaust catalyst temperature is below the first threshold. By directing all of the exhaust flow directly to exhaust after treatment system, exhaust heat from the exhaust gases are directly utilized for heating the exhaust catalysts in the exhaust passage. Further, in this embodiment, an EGR valve, such as EGR valve 82 that is configured as a variable EGR valve may be utilized. The EGR valve (that is, the variable EGR valve) may be closed to prevent exhaust gas flow from passage 86 to recirculation passage 56 via return passage 85.

In a second embodiment of method 400, as indicated at 406, a first timing of the first exhaust valves and/or a second timing of the second exhaust valves may be adjusted such that exhaust gases with greater heat energy are delivered to the exhaust catalyst in order to increase exhaust catalyst temperature. Specifically, first exhaust valves may be advanced to flow more exhaust gases with greater heat energy to the exhaust catalyst, and the second exhaust valves may be retarded to flow remaining exhaust gases with lesser heat energy to the heat exchanger. Further, in this embodiment, when timing of the exhaust valves are adjusted to adjust exhaust flow, instead of the variable EGR valve, an EGR valve, such as EGR valve 92 at FIG. 1B that is configured as a three-position valve may be utilized. Further, the second timing of the second exhaust valves may be adjusted based on the desired EGR flow if EGR is provided. As discussed herein with respect to FIG. 1B, when configured as a three-position valve, the EGR valve may be adjusted to a first position, a second position, or a third position. In the first position, the EGR valve may allow exhaust flow to the intake manifold after flowing through the heat exchanger, and the amount of exhaust flow to the intake may be adjusted by adjusting the second timing of the second exhaust valve. In the second position, the EGR valve may allow exhaust flow to the exhaust passage 85 via the heat exchanger 80, and in the third position, the EGR valve may block exhaust flow to the exhaust passage 85 and to recirculation passage, such as passage 56 and the intake manifold, such as intake manifold 27. Accordingly, during conditions when the exhaust catalyst temperature is less than the first threshold, the three-position valve may be adjusted to the third position to block exhaust flow to exhaust passage and the intake manifold. Taken together, when the exhaust catalyst temperature is less than the first threshold, the first timing of the first exhaust valve is advanced and/or the second timing of the second exhaust valve is retarded, and the EGR valve is adjusted to operate in the third position.

In a third embodiment of method 400, as indicated at 408, a first valve lift amount of the first exhaust valves and/or a second valve lift amount of the second exhaust valves may be adjusted to flow more exhaust gases to the first exhaust catalyst and less exhaust gases to the heat exchanger. Specifically, the first lift amount of the first exhaust valves may be greater than the second lift amount of the second exhaust valves. By providing a greater first valve lift amount, more exhaust flow may be provided to the exhaust catalyst. In this embodiment, the EGR valve may be a continuously variable valve for metering EGR flow into the intake manifold. During engine operating conditions when the exhaust catalyst temperature is below the first threshold, EGR may not be provided. Accordingly, the EGR valve may be closed such that flow to the intake manifold is blocked. However, the EGR valve may allow flow to the exhaust passage after flowing the through the heat exchanger.

Further, in some embodiments, adjustment of timings of the first exhaust valve and the adjustment of the valve lift amount of the second exhaust valves may be performed simultaneously.

In this way, the first exhaust valves, the second exhaust valves and the EGR valve may be adjusted to flow more exhaust gases to the exhaust after treatment system in order to increase a temperature of the exhaust catalyst above a light-off temperature.

Figure 5:
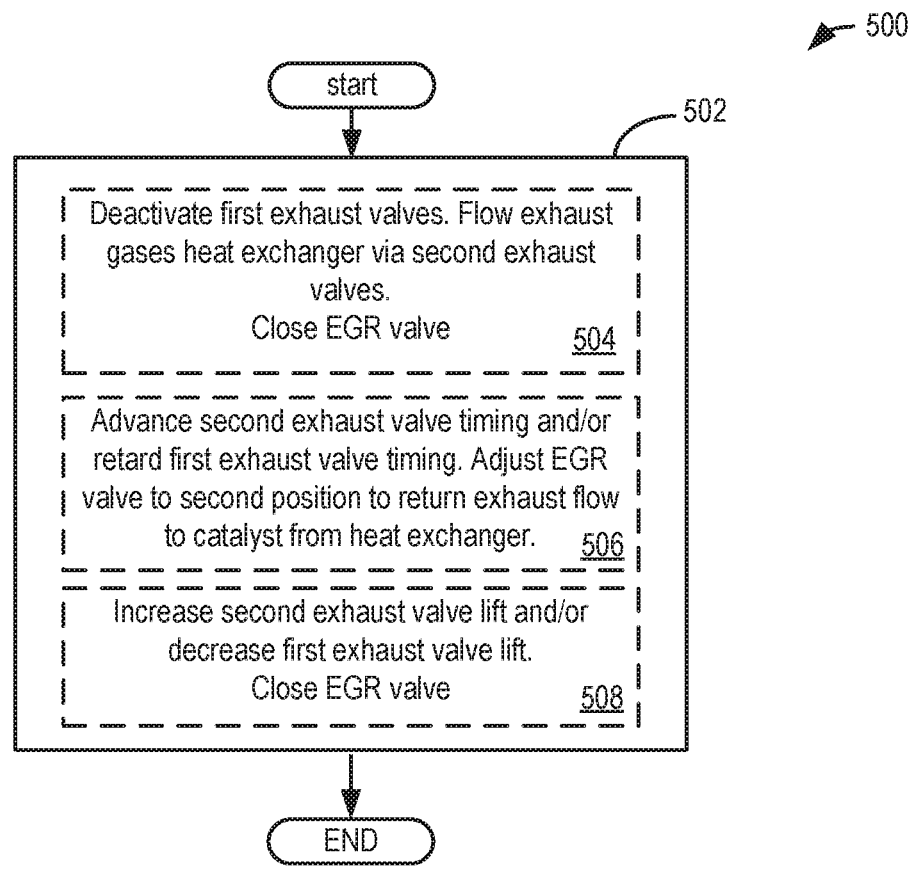
FIG. 5 shows a flow chart illustrating an example method that may be implemented for increasing exhaust flow to the heat exchanger, to be used in conjunction with FIG. 3.

Turning to FIG. 5, a flow chart illustrating an example method 500 for operating first exhaust valves, second exhaust valves, and the EGR valve to increase coolant temperature for engine warm-up is shown. Method 500 may be performed by a controller, such as controller 12 at FIG. 1A or 1B, in coordination with method 300 described at FIG. 3. Specifically, method 500 may be performed responsive to an engine coolant temperature less than a threshold coolant temperature. As such, the controller may adjust one or more actuators according to the method described below based on signals received from one or more sensors of the vehicle system. For example, as discussed above, based on an indication from an exhaust catalyst temperature sensor located within an exhaust catalyst and an engine coolant temperature sensor, the controller may adjust an exhaust valve cam actuation system including one or more exhaust valve cams (e.g., exhaust cam 253 at FIG. 2) to vary valve operation to control flow of exhaust gases. The controller may utilize one or more of CPS, VCT, VVT and/or VVL systems to vary valve operation.

At 502, method 500 includes adjusting exhaust flow to deliver all or more exhaust gases to the heat exchanger. In a first embodiment of method 500, as shown at 504, method 500 includes deactivating the first exhaust valves and maintaining the second exhaust valves active so that exhaust gases from the cylinder are delivered to the second exhaust manifold via second exhaust valves. Thus, during an exhaust phase of a cylinder cycle, the second exhaust valves are opened and the first exhaust valves are closed. As a result, the exhaust gases are flown to the heat exchanger, via the second exhaust valves and the second exhaust manifold, prior to flowing to the exhaust after treatment system. Thus, heat energy from the exhaust gases is transferred to the engine coolant through the heat exchanger. As a result, engine coolant temperature increases. Further, when the engine coolant temperature is less than the threshold, EGR may not be provided in order to reduce condensation in the engine system and the EGR system. Accordingly, the EGR valve maybe closed. In this embodiment, the EGR valve that is configured as a variable EGR valve, such as EGR valve 82 at FIG. 1A, may be utilized. The EGR valve (that is, the variable EGR valve) may be closed to prevent exhaust gas flow from passage 86 to recirculation passage 56 via return passage 85.

In a second embodiment of method 500, as indicated at 506, the first timing of the first exhaust valve and the second timing of the second exhaust valve may be adjusted to flow all or more of exhaust gas through the heat exchanger prior to flowing through the exhaust after treatment system. Further, as discussed above, when the first and the second exhaust valve timings are adjusted, the EGR valve may be configured as the three-position valve (e.g., EGR valve 92 at FIG. 1B). Thus, when it is desirable to flow more exhaust energy through the heat exchanger for coolant heating, the EGR valve may be adjusted to the second position. As a result, exhaust gases with greater heat energy flow from the cylinders to the heat exchanger via the second exhaust valves, and to the EGR valve downstream of the heat exchanger. At the EGR valve, the exhaust gases are diverted to the exhaust catalyst for exhaust after treatment. In this way, the second valve timing of the second exhaust valve, the first valve timing of the first exhaust valve, and the EGR valve may be adjusted to flow more higher energy exhaust gas through the heat exchanger to increase engine coolant temperature.

In a third embodiment of method 500, as shown at 508, the first valve lift amount and the second valve lift amount may be adjusted to flow more of exhaust gas through the heat exchanger. Specifically, the second valve lift amount may be increased and the first valve lift amount may be decreased. Further, the EGR valve may be closed to the intake manifold until the engine coolant temperature increases above the threshold. As discussed above, in this embodiment, the EGR valve that is configured as a variable valve may be utilized.

Figure 6:
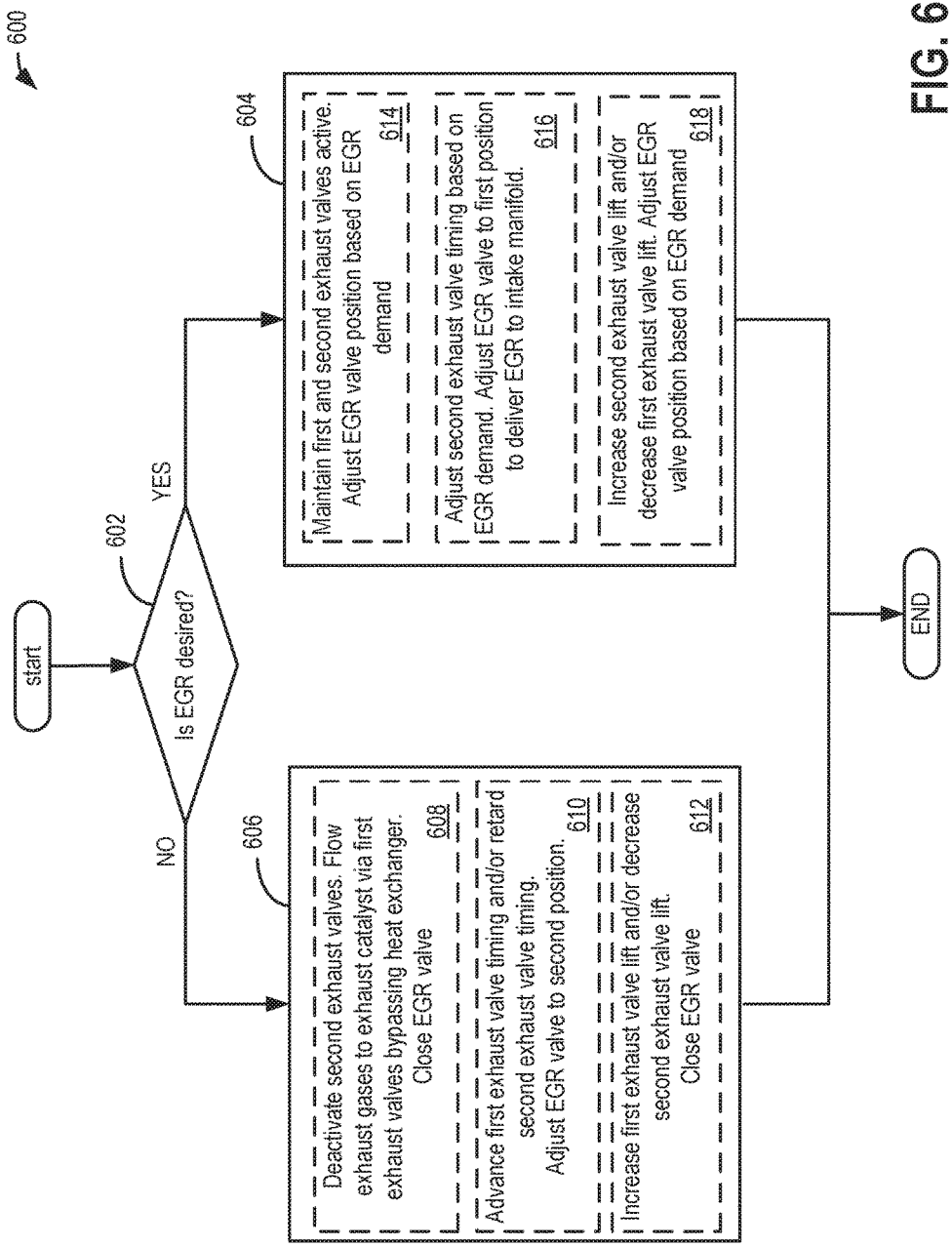
FIG. 6 shows a flow chart illustrating an example method that may be implemented for adjusting exhaust flow through the split exhaust manifold during engine warmed-up operation based on EGR requirement, to be used in conjunction with FIG. 3.

Next, FIG. 6 shows a flow chart illustrating an example method 600 for operating first exhaust valves, second exhaust valves, and the EGR valve during engine warmed-up conditions and when exhaust catalyst temperature is above the threshold, based on EGR demand. Method 600 may be performed by a controller, such as controller 12 at FIG. 1A or 1B, in coordination with method 300 described at FIG. 3. Specifically, method 600 may be performed responsive to an engine coolant temperature is at or greater than the threshold coolant temperature. As such, the controller may adjust one or more actuators according to the method described below based on signals received from one or more sensors of the vehicle system.

At 602, method 600 includes determining if EGR is desired. In one example, EGR is desired during predetermined engine operating conditions. For example, when the engine coolant temperature is greater than the threshold coolant temperature, when the engine load is greater than a threshold load and when engine speed is greater than a threshold speed. If it is determined that the EGR is desired, method 600 proceeds to 604. At 604, method 600 includes, in a first embodiment of method 600, as indicated at 614, maintaining the first exhaust valves and the second exhaust valves active. Thus, during an exhaust phase of a cylinder cycle, the first and the second exhaust valves may be opened to flow exhaust gases via the first exhaust valves to the first manifold and from thereon to the exhaust passage including the first exhaust catalyst, and flow exhaust gases via the second exhaust valve to the second manifold and subsequently to the heat exchanger. Further, in this embodiment, the EGR valve that is configured as a variable valve may be utilized. Accordingly, the EGR valve may be adjusted based on EGR demand. Specifically, as the EGR demand increases, the EGR valve may be opened more to flow more EGR to the intake manifold. The remaining exhaust gases that are not delivered to the intake manifold may be diverted from the EGR valve back to the exhaust passage and subsequently to the exhaust catalyst in the exhaust after treatment system.

In a second embodiment of method 600, as indicated at 616, the first exhaust valve timing and/or the second exhaust valve timing may be adjusted. Specifically, a timing of the second exhaust valve may be adjusted based on a desired EGR flow. Further, in this embodiment, the EGR valve that is configured as a three-position valve may be utilized (e.g., EGR valve 92 at FIG. 1B). The EGR valve may be adjusted the first position (as discussed with respect to FIG. 1B) to allow exhaust gas flow to the intake manifold via exhaust recirculation passage 56.

In a third embodiment of method 600, as indicated at 618, the first exhaust valve lift amount and/or the second exhaust valve lift amount may be adjusted. Specifically, the first exhaust valve lift amount may be increased and the second exhaust valve amount may be decreased. Further, in this embodiment, the EGR valve that is configured as a variable valve may be utilized. Accordingly, the EGR valve may be adjusted based on EGR demand. In this way, by decreasing exhaust flow to the heat exchanger and increasing exhaust flow to the exhaust catalyst, excessive increase in engine coolant temperature may be reduced while providing desired exhaust gas recirculation.

Returning to 602, if it is confirmed that EGR is not required, method 600 proceeds to 606. At 606, method 600 includes delivering a majority or all of the exhaust directly to the exhaust catalyst without directing the exhaust gases through the heat exchanger. Accordingly, in the first embodiment of method 600, as indicated at 608, method 600 includes deactivating the second exhaust valves and maintaining the first exhaust valves active. Thus, during an exhaust phase of a cylinder cycle, the first exhaust valves may be opened and the second exhaust valves may be closed. Further, in this embodiment, the EGR valve that is configured as a variable valve may be utilized. Accordingly, the EGR valve may be closed. By opening the first exhaust valves and closing the second exhaust valves, the exhaust flow to the heat exchanger may be bypassed and the exhaust gases are delivered to the exhaust catalyst via the first exhaust valves and the first exhaust manifold.

In the second embodiment of method 600, as indicated at 610, method 600 includes advancing the first exhaust valves, retarding the second exhaust valves, and adjusting the EGR valve (the EGR valve configured as a three-position valve in this embodiment) to the third position. At the third position, the EGR valve may block exhaust flow to the exhaust passage and the intake manifold. In this way, by advancing the first exhaust valves and retarding the second exhaust valves, majority of the exhaust gases with greater heat energy are delivered to the exhaust catalyst via the first exhaust valves and the first exhaust manifold. The remaining exhaust gases with lesser heat energy are delivered to the heat exchanger and subsequently delivered to the exhaust after treatment system after passing through the heat exchanger. As a result, when EGR is not required and the engine coolant temperature is greater than the threshold, excess increase in engine coolant temperature due to exhaust flow is reduced.

In the third embodiment of method 600, as indicated at 612, the first exhaust valve lift amount may be increased, the second exhaust valve lift amount may be decreased, and the EGR valve (configured as a variable valve in this embodiment) may be closed.

In this way, by directing majority or all of exhaust flow to the exhaust catalyst and allowing reduced or no flow of exhaust gases to the heat exchanger, excessive increase in engine coolant temperature may be reduced.

Each of the methods 400, 500, and 600 are discussed with respect to a first, second, and third embodiment. In the second embodiments of the methods, valve timings of the exhaust valves are adjusted; and when the second embodiment is implemented, the EGR valve may be configured as a three-position valve (e.g., EGR valve 92 at FIG. 1B). In the first embodiments of the methods, the activation or deactivation of exhaust valves are controlled; and in the third embodiments of the methods, valve lift amounts of the exhaust valves are adjusted. Further, when first and the third embodiments are used, the EGR valve may be configured as a variable or continuously variable valve (e.g., EGR valve 82 at FIG. 1A). It will be appreciated that examples where a combination of exhaust valve activation/deactivation control (discussed in the first embodiments of the methods) along with variable valve lift amounts (discussed in the third embodiments of the methods) is used are also within the scope of this disclosure.

Figure 7:
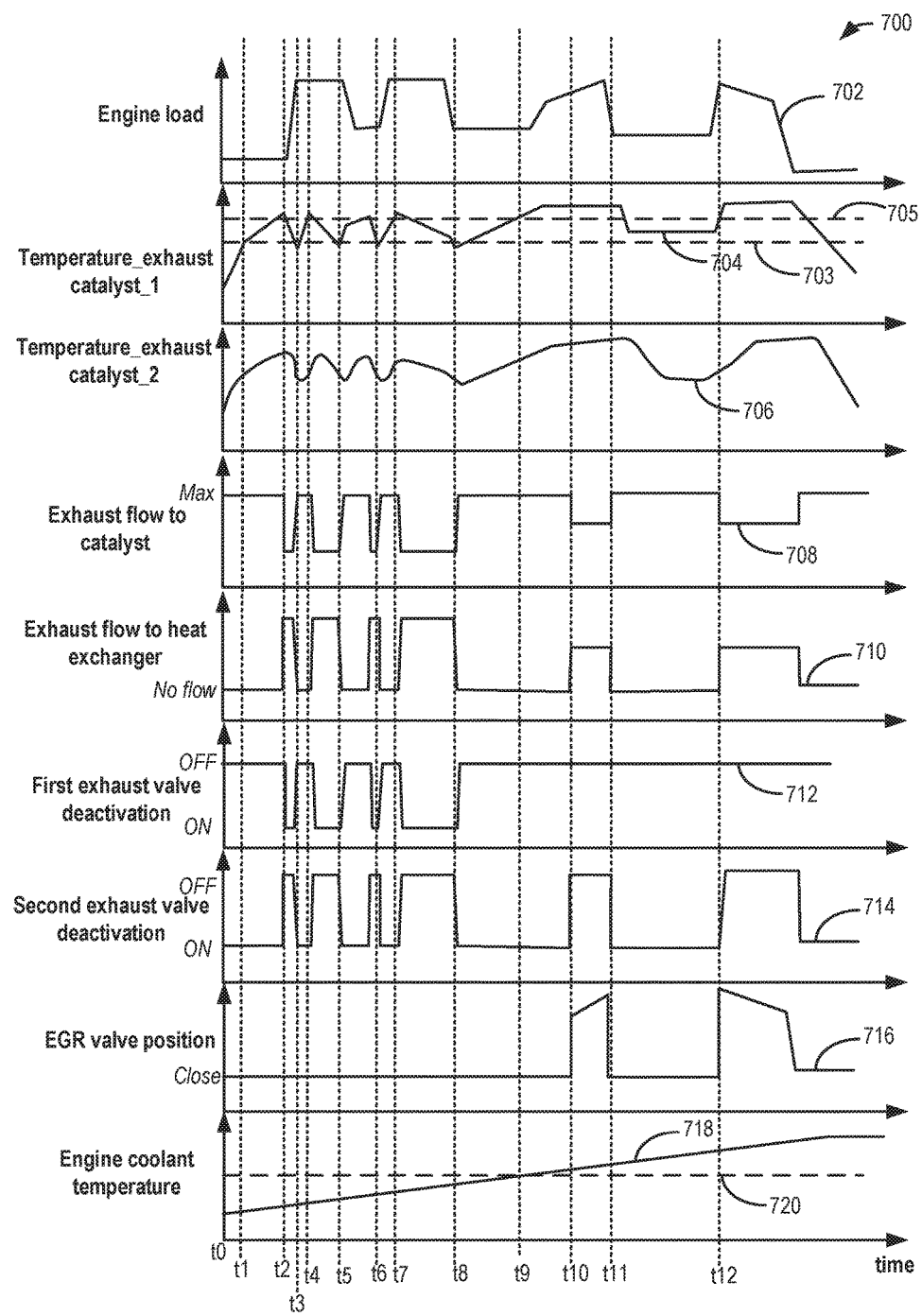
FIG. 7 shows a map depicting example adjustment of a first exhaust valve, a second exhaust valve, and an EGR valve for controlling EGR flow and exhaust gas flow through a split exhaust manifold, according to a first embodiment of the present disclosure.

Turning to FIG. 7, it shows a map 700 depicting an example operation of a first exhaust valve (e.g. valve E1 at FIG. 1A or 1B), a second exhaust valve (e.g. valve E2 at FIG. 1A or 1B), and an EGR valve (e.g., EGR valve 82 at FIG. 1A) to adjust exhaust flow to a heat exchanger (e.g. heat exchanger 80 at FIG. 1A or 1B) and a first exhaust catalyst (e.g. emission control device 72 at FIG. 1A or 1B) included in an exhaust system of a split exhaust engine system, such as the engine system 10 at FIG. 1A or 1B. Specifically, the exhaust flow may be adjusted based on a first catalyst temperature of the first exhaust catalyst and an engine coolant temperature. The sequence of FIG. 7 may be provided by executing instructions in the system of FIGS. 1-2 according to the methods of FIGS. 3, 4, 5, and 6. Vertical markers at times t1-t12 represent times of interest during the sequence. In all the plots discussed below, the X-axis represents time and time increases from the left side of each plot to the right side of each plot.

The first plot from top of FIG. 7 depicts engine load versus time. The Y-axis represents an engine load and the engine load increases in the direction of the Y-axis arrow. Trace 702 represents engine load.

The second plot from top of FIG. 7 depicts first exhaust catalyst temperature (that is, temperature of the first exhaust catalyst) versus time. The Y-axis represents a first exhaust catalyst temperature and the first exhaust catalyst temperature increases in the direction of the Y-axis arrow. Trace 704 represents change in the first exhaust catalyst temperature. Horizontal line 703 represents a first exhaust catalyst temperature threshold, and horizontal line 705 represents a second exhaust catalyst temperature threshold. As such, the second threshold temperature is greater than the first threshold temperature.

The third plot from top of FIG. 7 depicts second exhaust catalyst temperature (that is, temperature of a second exhaust catalyst downstream (with respect to exhaust flow) of the first exhaust catalyst) versus time. The Y-axis represents a second exhaust catalyst temperature and the second exhaust catalyst temperature increases in the direction of the Y-axis arrow. Trace 706 represents change in the second exhaust catalyst temperature.

The fourth plot from top of FIG. 7 depicts exhaust flow through the first exhaust catalyst versus time. The Y-axis represents flow through the first exhaust catalyst and the flow increases in the direction of the Y-axis arrow. Trace 708 represents the flow through the first exhaust catalyst. For example, exhaust flow may be delivered from an engine cylinder to the first exhaust catalyst via the first valve and a first exhaust manifold (e.g., first exhaust manifold 57 at FIG. 1A or 1B).

The fifth plot from top of FIG. 7 depicts the portion of exhaust mass flow through the heat exchanger versus time. The Y-axis represents the flow through the heat exchanger and the flow through the heat exchanger increases in the direction of the Y-axis arrow. Trace 710 represents the exhaust mass flow through the catalyst. For example, exhaust mass flow may be delivered from an engine cylinder to the catalyst via the second valve and a second exhaust manifold (e.g. second exhaust manifold 59 at FIG. 1A or 1B).

The sixth plot from top of FIG. 7 depicts position of the first exhaust valve versus time. The Y-axis represents an open or closed position of the first exhaust valve during the exhaust stroke of a cylinder cycle. Trace 712 represents change in the position of the first exhaust valve The seventh plot from top of FIG. 7 depicts position of the second exhaust valve versus time. The Y-axis represents an open or closed position of the second exhaust valve during the exhaust stroke of the cylinder cycle. Trace 714 represents change in the position of the second exhaust valve The eighth plot from top of FIG. 7 depicts EGR valve position versus time. The Y-axis represents an opening of the EGR valve and the EGR valve opening increases in the direction of Y-axis arrow. Trace 716 represents the blow-down valve duration.

The ninth plot from top of FIG. 7 depicts engine coolant temperature versus time. The Y-axis represents the engine coolant temperature and the engine coolant temperature increases in the direction of Y-axis arrow. Trace 718 represents the change in engine coolant temperature. Horizontal line 720 represents threshold engine coolant temperature.

As such, the second threshold temperature may be based on a desired temperature for the first exhaust catalyst to light-off; and the threshold coolant temperature may be based on one or more of a vehicle cabin heating demand and a desired temperature of a cylinder head.

At times before t1, the engine may be operating with the first exhaust catalyst temperature (704) below the first threshold (703). As such, the first threshold may be below the catalyst light-off temperature. Further, the engine coolant temperature (718) is below the coolant temperature threshold (720). Thus, the engine may be operating under cold start conditions. When the first exhaust catalyst temperature is below the first threshold and the engine coolant temperature is below the coolant temperature threshold, priority may be given to increasing the first exhaust catalyst temperature over increasing the increasing the coolant temperature. Therefore, in order to increase the first exhaust catalyst temperature, all of the exhaust gases resulting from combustion of the cylinder may be directed to flow from the cylinder via the first exhaust valve and the first exhaust manifold to the first exhaust catalyst. Accordingly, the first exhaust valve of the cylinder is active to flow exhaust gases via the first exhaust valve to the first exhaust manifold and the second exhaust valve of the cylinder is deactivated. Further, in order to reduce condensation, EGR may not be provided as long as the engine coolant temperature is below the threshold. Therefore, the EGR valve may be closed. At the closed position, the EGR valve may block flow to the intake manifold and allow exhaust gas flow to re-enter the exhaust passage via a return passage, such as return passage 85 at FIG. 1A or 1B.

At t1, the first exhaust catalyst temperature is at the first threshold temperature. When the first exhaust catalyst is at the first threshold, between the first and the second threshold, or at the second threshold, the engine may operate to maintain the exhaust valves in their latest positions. Thus, exhaust gases may be continued to flow to the first exhaust catalyst, bypassing the heat exchanger, until the first exhaust catalyst temperature increases above the second threshold. Therefore, at t1, the first exhaust valve is maintained active and the second exhaust valve is maintained in the deactivated state to direct exhaust flow directly to the exhaust catalyst via the first exhaust valve and the first exhaust manifold for catalyst heating. Further, at t1, the EGR valve may remain closed.

At times between t1 and until just before t2, the first exhaust catalyst temperature is between the first and the second threshold. Therefore, as mentioned above, the engine may operate to maintain the exhaust valves in their latest states. As a result, the first exhaust valve remains active and the second exhaust valve remains deactivated.

At t2, the first exhaust catalyst temperature increases above the second threshold temperature. As mentioned above, the second catalyst temperature may be a temperature at which the first exhaust catalyst light off occurs. However, the engine coolant temperature may remain below the threshold. When the first exhaust catalyst temperature is above the second threshold temperature, and the engine coolant temperature is below the threshold, exhaust gas is flown to the heat exchanger to increase the coolant temperature via the heat exchanger. Accordingly, the first exhaust valve is deactivated and the second exhaust valve is activated. By deactivating the first exhaust valve and activating the second exhaust valve, exhaust gases are directed first to the heat exchanger via the second exhaust valve and the second exhaust manifold. Thus, at t2, exhaust flow through the heat exchanger increases while the exhaust mass flown directly to the catalyst decreases. In this way, the exhaust heat energy is utilized to heat the engine coolant via the heat exchanger. Further, at t2, due to the engine coolant temperature remaining below the threshold coolant temperature, the EGR valve may remain closed. Accordingly, at t2, the exhaust gases flow from the cylinder to the heat exchanger via the second exhaust valve and the second exhaust manifold; and subsequently, flow from the heat exchanger to an exhaust passage (e.g., exhaust passage 58) including the first exhaust catalyst via the return passage.

At times between t2 and t3, the engine load may increase (e.g., due to actuation of accelerator pedal). Further, the first exhaust catalyst temperature decreases due to all the exhaust heat energy being directed to the heat exchanger for engine coolant heating; and the engine coolant temperature increases but remains below the threshold. However, between t2 and until just before t3, the first exhaust catalyst temperature may be at or above the first threshold but below the second threshold. Responsive to the exhaust catalyst temperature being at or above the first threshold but below the second threshold, the engine operates to maintain the exhaust valves in the latest condition. Accordingly, between t2 and t3, the first exhaust valve may remain deactivated and the second exhaust valve may remain activated, and the exhaust gases may continue to be used for coolant heating. Thus, between t2 and t3, exhaust gases do not flow directly to the first exhaust catalyst. Instead, the exhaust gases flow to the heat exchanger via the second exhaust valve and the second exhaust manifold and subsequently flow to the exhaust passage including the first exhaust catalyst via the return passage.

At a time just before t3, the exhaust catalyst temperature may decrease below the first threshold. Responsive to the first exhaust catalyst temperature decreasing below the first threshold, at t3, the first exhaust valve is activated and the second exhaust valve is activated. Consequently, exhaust flow directly to the catalyst, bypassing the heat exchanger. Thus, the exhaust flow is utilized for catalyst heating. Further, between t2 and t3, and at t3, the EGR valve may remain closed.

At t4, the first exhaust catalyst temperature is above the second threshold, and the engine coolant temperature remains below the threshold coolant temperature. Responsive to the first catalyst temperature above the second threshold, and the engine coolant temperature below the threshold, between t4 and t5, the first exhaust valve is deactivated, the second exhaust valve is activated to direct exhaust flow to heat exchanger from the cylinder for coolant heating, and the EGR valve remains closed.

At t5 and times between t5 and t8, the engine coolant temperature may remain below the coolant temperature threshold. Therefore, during these times, the EGR valve may be closed. Further, the first exhaust valve may be activated and the second exhaust valve may be deactivated when the first exhaust catalyst temperature decreases below the first threshold to deliver exhaust flow to the first exhaust catalyst and bypassing the heat exchanger. When the first exhaust catalyst temperature increases above the second threshold, the first exhaust valve may be deactivated and the second exhaust valve may be activated to deliver exhaust flow first to the heat exchanger for coolant heating and then flowing the cooled exhaust gases from the heat exchanger to the first exhaust catalyst via the return passage. Further, when the first exhaust catalyst temperature is at the first threshold, between the first and the second threshold, or at the second threshold, the engine may operate to maintain the first and the second exhaust valves at the latest conditions.

At t9, the engine coolant temperature may reach the threshold coolant temperature. Further, at t9, the first exhaust catalyst temperature may be above the second threshold. Responsive to the coolant temperature above the threshold, the exhaust valves may be adjusted to reduce further increase in coolant temperature. Further, responsive to the coolant temperature above the threshold coolant temperature, EGR may be provided based on a desired EGR flow. Therefore, at times between t9 and t10, exhaust gases are flown directly to the first exhaust catalyst, bypassing the heat exchanger, to reduce coolant temperature increase. Thus, between t9 and t10, the first exhaust valve is activated and the second exhaust valve is deactivated. Further, between t9 and t10, the desired EGR flow may be zero. Therefore, the EGR valve may be closed.

At a time point just before t10, the desired EGR flow may increase. Responsive to the increase in the desired EGR flow, at t10, the EGR valve may be adjusted from the closed position to a more open position, the amount of opening based on the desired EGR flow. Further, at t10, the first and the second exhaust valves may be activated. Thus, at t10, a first portion of exhaust gases are delivered to the first exhaust catalyst via the first exhaust valve and the first exhaust manifold; a second portion of the exhaust gases are delivered to the heat exchanger via the second exhaust valve and the second exhaust manifold, and subsequently to the intake manifold from the heat exchanger via the EGR valve; and a third portion of the exhaust gases are delivered to the heat exchanger via the second exhaust valve and the second exhaust manifold, and routed back to the exhaust passage (including the first exhaust catalyst) from the heat exchanger via the return passage.

At times between t10 and t11, the engine coolant temperature may remain above the threshold; the first and the second exhaust valves are active; and the EGR valve may be adjusted based on the desired EGR flow.

At t11, the desired EGR flow may decrease to zero. Responsive to the change in EGR requirement to zero, the EGR valve is adjusted to a closed position (no flow to intake manifold). Further, the first exhaust valve is active while the second exhaust valve is closed to flow exhaust gases directly from the cylinder to the exhaust catalyst, bypassing the heat exchanger, to reduce excessive increase in engine coolant temperature.

At times between t11 and t12, the desired EGR flow may remain at zero. Consequently, the EGR valve is closed (no flow to intake manifold); the first exhaust valve is active; and the second exhaust valve is deactivated.

At t12 and beyond, EGR valve position is adjusted based on the desired EGR flow. Further, the first and the second exhaust valves are adjusted to be active when the desired EGR flow is greater than zero; or when the desired EGR flow is zero, flow through the heat exchanger is stopped and all of the exhaust are directed to the exhaust catalyst bypassing the heat exchanger.

Figure 8:
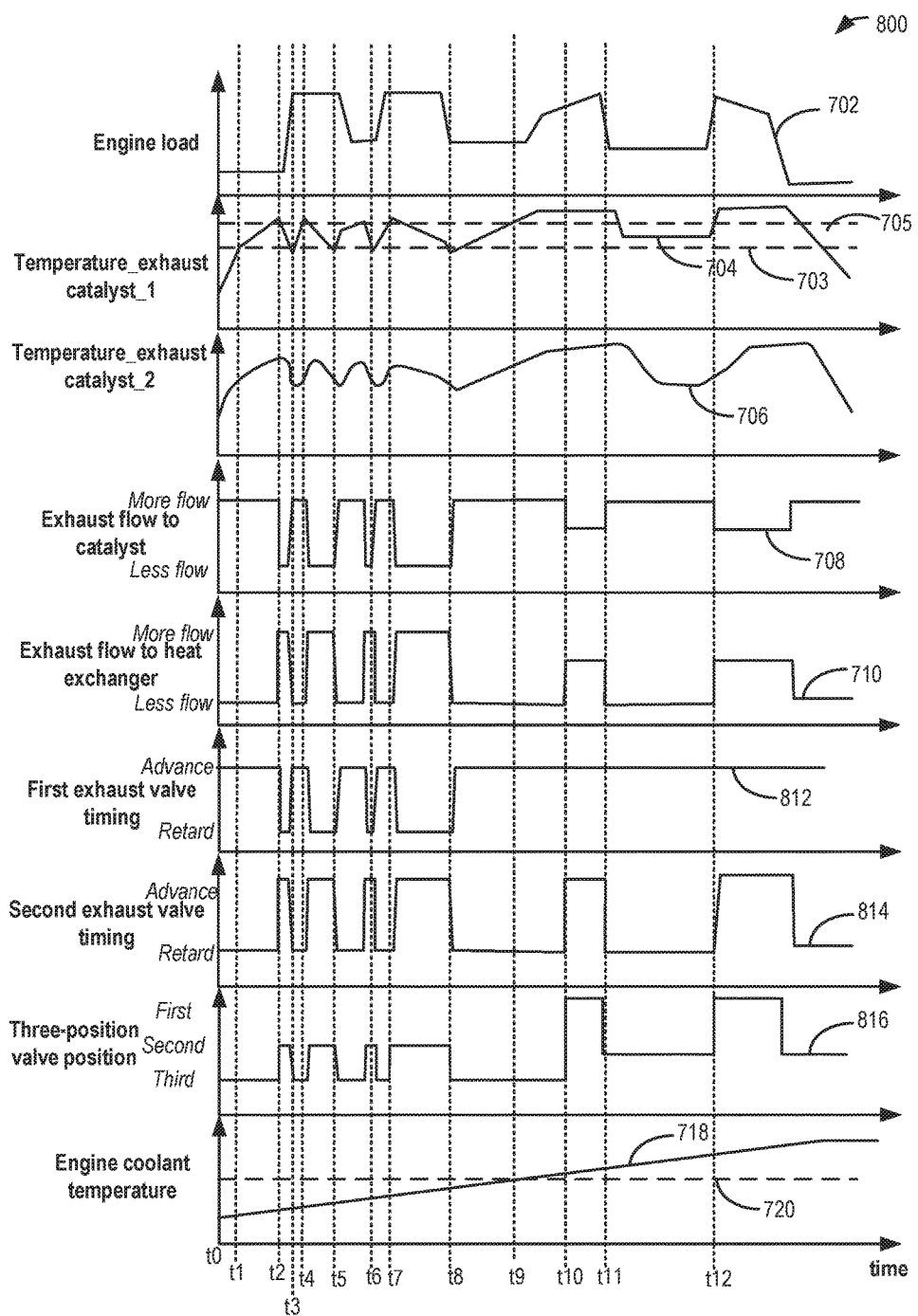
FIG. 8 shows a map depicting example adjustment of the first exhaust valve, the second exhaust valve, and an EGR valve configured as a three-position valve for controlling EGR flow and exhaust gas flow through the split exhaust manifold, according to a second embodiment of the present disclosure.

Turning to FIG. 8, it shows a map 800 depicting another example operation of a first exhaust valve (e.g. valve E1 at FIG. 1A or 1B), a second exhaust valve (e.g. valve E2 at FIG. 1A or 1B), and a three-position valve (e.g., EGR valve 92 at FIG. 1B) to adjust exhaust flow to a heat exchanger (e.g. heat exchanger 80 at FIG. 1A or 1B) and a first exhaust catalyst (e.g. first emission control device 72 at FIG. 1A or 1B) included in an exhaust system of a split exhaust engine system, such as the engine system 10 at FIG. 1A or 1B. Specifically, the exhaust flow may be adjusted based on a first catalyst temperature of the first exhaust catalyst and an engine coolant temperature. The sequence of FIG. 8 may be provided by executing instructions in the system of FIGS. 1-2 according to the methods of FIGS. 3, 4, 5, and 6. Vertical markers at times t1-t12 represent times of interest during the sequence. In all the plots discussed below, the X-axis represents time and time increases from the left side of each plot to the right side of each plot.

The first, second, third, fourth, fifth, and ninth plots from the top of FIG. 8 are similar to first, second, third, fourth, fifth, and ninth plots of FIG. 7. Therefore, the plots are similarly numbered and the description of the plots will be omitted for the sake of brevity. The sixth, seventh, and eighth plots from the top of FIG. 8 will be briefly described below.

The sixth plot from top of FIG. 8 depicts a timing of the first exhaust valve versus time. The Y-axis represents the first valve timing and a degree of retard decreases in the direction of Y-axis arrow. Trace 812 represents change in the first exhaust valve timing.

The seventh plot from top of FIG. 8 depicts a timing of the second exhaust valve versus time. The Y-axis represents the second valve timing and a degree of retard decreases in the direction of Y-axis arrow. Trace 814 represents change in the second exhaust valve timing.

The eighth plot from top of FIG. 8 depicts a position of a three-position valve versus time. The Y-axis represents a first, a second, and a third position of the three-position valve. In the first position, the three-position valve may allow all of exhaust gases from the heat exchanger to flow to an exhaust recirculation passage (e.g., passage 56 at FIG. 1A or 1B) and subsequently to an intake manifold (e.g., intake manifold 27 at FIG. 1A or 1B). In the second position, three-position valve 92 may allow all of exhaust gases from the heat exchanger to flow to the return passage and subsequently to the exhaust after treatment system. In the third position, the three-position valve 92 may block flow of exhaust gases from the heat exchanger to both the exhaust recirculation and return passages. Trace 816 represents the change in three-position valve position.

At times before t1, in order to increase the first exhaust catalyst temperature, exhaust flow to the exhaust catalyst is increased by advancing a first timing of the first exhaust valve and retarding a second timing of the second exhaust valve. By advancing the first timing of the first exhaust valve, exhaust gases with greater energy (expanding gases in the cylinder before a piston of the cylinder reaches BDC at the exhaust stroke) may be delivered to the first exhaust catalyst via the first exhaust valve and the first exhaust manifold. Exhaust gases with lesser energy (residual gases that remain in the cylinder) may be delivered to the heat exchanger via the second exhaust valve and the second exhaust manifold. Further, in order to reduce condensation, EGR may not be provided as long as the engine coolant temperature is below the threshold. Therefore, the three-position valve may be in the third position. In the third position, the three-position valve may block flow to the intake manifold and block exhaust gas flow from re-entering the exhaust passage via return passage 85. In the third position, the three-position valve may effectively prevent exhaust gas from leaving the engine via the second exhaust valve and passage 55. All of the exhaust gas may exit the cylinder via the first valve through manifold 57.

When the first exhaust catalyst is at the first threshold, between the first and the second threshold, or at the second threshold, the engine may operate to maintain the exhaust valves in their latest timings. Therefore, at t1, and between t1 and until just before t2, the first exhaust valve is operated with advancing the first exhaust valve timing and retarding the second exhaust valve timing to flow exhaust gases with greater energy to the exhaust catalyst via the first exhaust valve and the first exhaust manifold for catalyst heating. Further, at t1, the three-position valve may remain closed. Thus, the three-position valve may be adjusted to the third position, at which the EGR valve blocks exhaust gas flow to the intake manifold and to the exhaust catalyst.

At t2, when the first exhaust catalyst temperature is above the second threshold temperature, and the engine coolant temperature is below the threshold, exhaust gas with greater energy is flown to the heat exchanger to increase the coolant temperature via the heat exchanger. Accordingly, the second exhaust valve timing is advanced and the first exhaust valve timing is retarded. By advancing the second exhaust valve timing and retarding the first exhaust valve, a larger portion of the exhaust gases with greater energy are directed to the heat exchanger via the second exhaust valve and the second exhaust manifold. Thus, at t2, exhaust mass flow through the heat exchanger increases while the exhaust mass flow through the catalyst decreases. In this way, the exhaust heat energy is utilized to heat the engine coolant via the heat exchanger. Further, at t2, due to the engine coolant temperature remaining below the threshold coolant temperature, the three-position valve may remain closed to the intake manifold only (second position). Accordingly, at t2, the exhaust gases flow from the cylinder to the heat exchanger via the second exhaust valve and the second exhaust manifold; and subsequently, flow from the heat exchanger to an exhaust passage (e.g. exhaust passage 58) including the first exhaust catalyst via a return passage (e.g., return passage 85 at FIG. 1A or 1B).

At times between t2 and until just before t3, responsive to the exhaust catalyst temperature being at or above the first threshold but below the second threshold, the engine operates to maintain the timings of exhaust valves. Accordingly, between t2 and t3, the second exhaust valve timing may remain advanced and the first exhaust valve may remain retarded. Thus, the exhaust gases may continue to be used for coolant heating.

At t3 and times between t3 and t8, the engine coolant temperature may remain below the coolant temperature threshold. Therefore, during these times, the three-position valve may be closed to the intake manifold. That is, the three-position valve may be operated in the second position to allow exhaust flow from the heat exchanger to the return passage and subsequently to the exhaust catalyst, or the three-position valve may be operated in the third position blocking exhaust gas flow to both the recirculation passage and the return passage. The three-position valve position during these times may be based on the desired flow to through the heat exchanger and the first exhaust catalyst temperature as indicated at 814 and discussed below.

Further, the first exhaust valve timing may be advanced and the second exhaust valve may be retarded when the first exhaust catalyst temperature decreases below the first threshold to deliver majority of the exhaust flow to the first exhaust catalyst and bypassing the heat exchanger. When the second exhaust valve is retarded, responsive to the second exhaust catalyst temperature decreasing below the first threshold, the three-position valve may be operated in the second position.

Further, when the first exhaust catalyst temperature increases above the second threshold, the first exhaust valve may be retarded and the second exhaust valve may be advanced to deliver majority of the exhaust flow first to the heat exchanger for coolant heating and then flowing the cooled exhaust gases from the heat exchanger to the first exhaust catalyst via the return passage. When the second exhaust valve is advanced responsive to the first exhaust catalyst temperature increasing above the first threshold, the three-position valve may be operated in the third position.

Further, when the first exhaust catalyst temperature is at the first threshold, between the first and the second threshold, or at the second threshold, the engine may operate to maintain the latest first and the second exhaust valve timings.

At t9, responsive to the coolant temperature above the threshold coolant temperature, EGR may be provided based on a desired EGR flow. Further, at t9, the first exhaust catalyst temperature may be above the second threshold. Responsive to the coolant temperature above the threshold, the exhaust valve timings may be adjusted to reduce further increase in coolant temperature. Therefore, at t9 and at times between t9 and t10, majority of the exhaust gases are flown to the first exhaust catalyst, bypassing the heat exchanger, to reduce coolant temperature increase. Thus, at t9 and between t9 and t10, the first exhaust valve timing is advanced and/or the second exhaust valve is retarded. Further, at t9 and between t9 and t10, the desired EGR flow may be zero. Therefore, the three-position valve may be closed (third position).

At a time point just before t10, the desired EGR flow may increase. Responsive to the increase in the desired EGR flow, at t10, the three-position valve may be adjusted from the closed position to first position that allows flow of exhaust gases from the heat exchanger to the intake manifold. The desired EGR flow may be provided by adjusting the timing of the first and second exhaust valves. For example, if more EGR flow is desired, the second exhaust valve timing may be more advanced than the first exhaust valve timing. Thus, at t10, a first portion of exhaust gases are delivered to the first exhaust catalyst via the first exhaust valve and the first exhaust manifold; a second portion of the exhaust gases are delivered to the heat exchanger via the second exhaust valve and the second exhaust manifold, and subsequently to the intake manifold from the heat exchanger via the three-position valve.

At times between t10 and t11, the engine coolant temperature may remain above the threshold; and the first and the second exhaust timings may be adjusted based on the desired EGR flow. Further, the EGR valve may be maintained at the first position.

At t11, the desired EGR flow may decrease to zero, and may remain at zero between t11 and t12. Responsive to the change in EGR requirement to zero, the three-position valve is adjusted to a closed position (no flow to intake manifold). Further, to flow exhaust gases directly from the cylinder to the exhaust catalyst, bypassing the heat exchanger, the first exhaust valve may be advanced and the second exhaust valve may be retarded.

At t12 and beyond, the three-position valve position is adjusted based on the desired EGR flow (that is, closed (second position) if no EGR is desired or at the first position open to intake manifold if EGR is desired). Further, the first and the second exhaust valve timings are adjusted to provide the desired EGR flow when the desired EGR flow is greater than zero; or when the desired EGR flow is zero, flow through the heat exchanger is reduced and majority of the exhaust gases are directed to the exhaust catalyst bypassing the heat exchanger.

In some examples, in addition to adjusting the first exhaust valve timing and/or the second exhaust valve timing, a first duration of the first exhaust valve opening and/or a second duration of second exhaust valve opening may be adjusted. For example, if more exhaust flow to the exhaust catalyst is desired, such as when the exhaust catalyst temperature is less than the first threshold, in addition to advancing the first exhaust valve timing and/or retarding the second exhaust valve timing, the first duration may be increased and/or the second duration may be decreased. Similarly, if more flow to the heat exchanger is desired, such as when the exhaust catalyst temperature is above the second threshold and the engine coolant temperature is below the threshold coolant temperature, in addition to retarding the first exhaust valve timing and/or advancing the second exhaust valve timing, the first duration may be decreased and/or the second duration may be increased.

Figure 9:
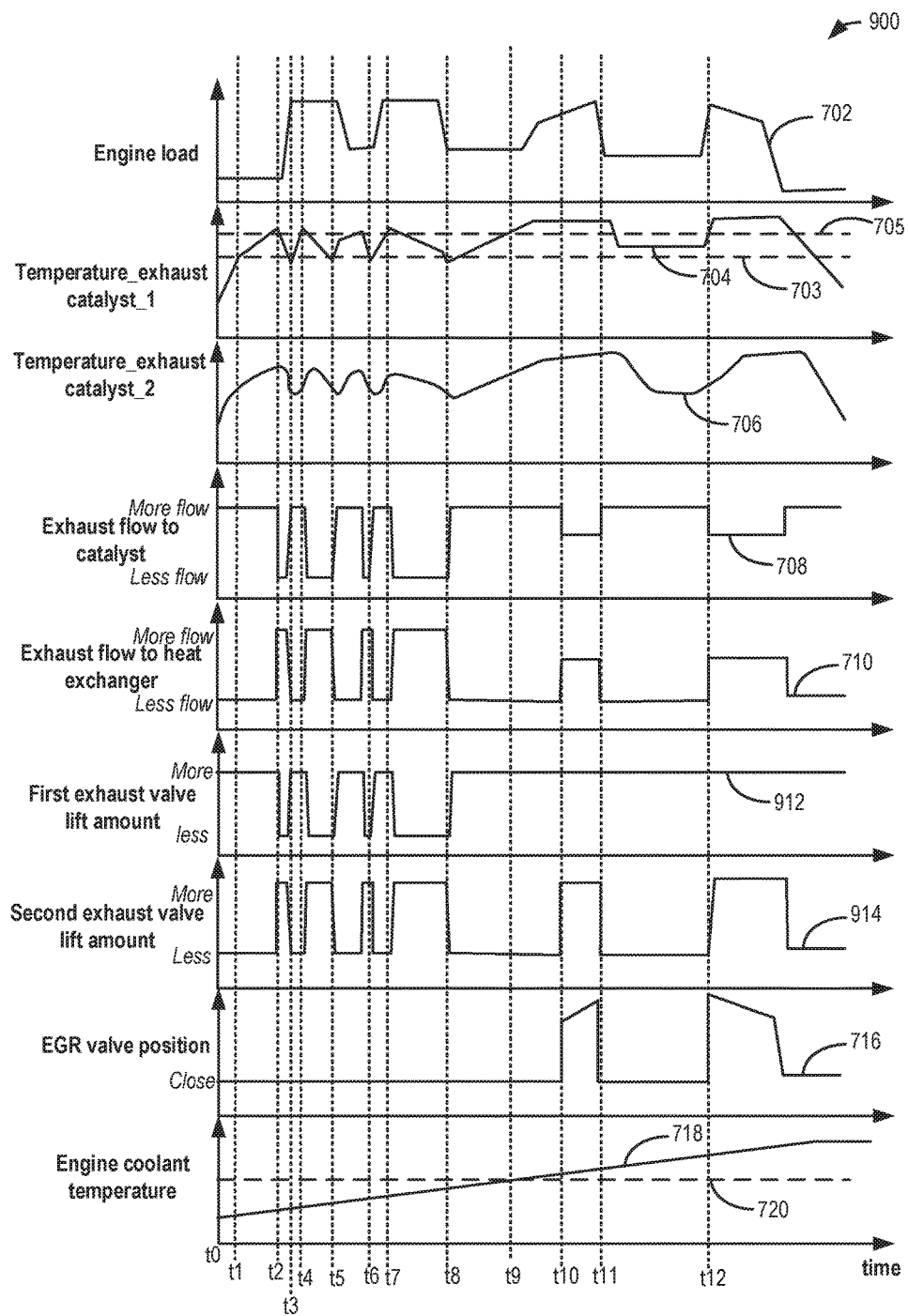
FIG. 9 shows a map depicting example adjustment of the first exhaust valve, the second exhaust valve, and the EGR valve for controlling EGR flow and exhaust gas flow through a split exhaust manifold, according to a third embodiment of the present disclosure.

FIG. 9 shows a map 900 depicting another example operation of a first exhaust valve (e.g. valve E1 at FIG. 1A or 1B), a second exhaust valve (e.g. valve E2 at FIG. 1A or 1B), and an EGR valve (e.g., EGR valve 82 at FIG. 1A) to adjust exhaust mass flow to the heat exchanger and the first exhaust catalyst included in the exhaust system of the split exhaust engine system. Specifically, the exhaust flow may be adjusted based on a first catalyst temperature of the first exhaust catalyst and an engine coolant temperature. The sequence of FIG. 9 may be provided by executing instructions in the system of FIGS. 1-2 according to the methods of FIGS. 3, 4, 5, and 6. Vertical markers at times t1-t12 represent times of interest during the sequence. In all the plots discussed below, the X-axis represents time and time increases from the left side of each plot to the right side of each plot.

The first, second, third, fourth, fifth, eighth and ninth plots from the top of FIG. 9 are similar to first, second, third, fourth, fifth, eighth, and ninth plots of FIG. 7. Therefore, the plots are similarly numbered, and the description of the plots will be omitted for the sake of brevity. The sixth and the seventh plots from the top of FIG. 9 will be briefly described below.

The sixth plot from top of FIG. 9 depicts a first exhaust valve lift amount versus time. The Y-axis represents the first valve lift amount and the lift amount increases in the direction of Y-axis arrow. Trace 912 represents change in the first exhaust valve lift amount.

The seventh plot from top of FIG. 9 depicts a second exhaust valve lift amount versus time. The Y-axis represents the second valve lift amount and lift amount increases in the direction of Y-axis arrow. Trace 914 represents change in the second exhaust valve lift amount.

As shown in the sixth and the seventh plots, in order to increase exhaust flow to the exhaust catalyst, the first exhaust valve lift amount may be increased and the second exhaust valve lift amount may be reduced. Similarly, in order to increase flow to the heat exchanger, the first exhaust valve lift amount may be reduced and the second exhaust valve lift amount may be increased. Further, as shown, EGR may not be provided until the engine coolant temperature reaches the threshold coolant temperature. When the coolant temperature is at or above the threshold coolant temperature, desired EGR flow may be provided by increasing flow to the heat exchanger and adjusting the EGR valve position based on the desired EGR flow. However, when the coolant temperature is at or above the threshold, if EGR is not desired, flow to the heat exchanger may be reduced by increasing the first exhaust valve lift amount and decreasing the second exhaust valve lift amount to reduce excessive increase in coolant temperature.

In this way, the first exhaust valve lift amount and the second exhaust valve lift amount may be adjusted to adjust exhaust flow in the split exhaust system.

As one embodiment a method for an engine includes during a cold start condition, before light-off of an exhaust catalyst, flowing exhaust drawn from a first exhaust valve of each engine cylinder to the exhaust catalyst while bypassing a heat exchanger; and after light-off of the exhaust catalyst, flowing exhaust drawn from a second exhaust valve of each engine cylinder to the heat exchanger, and transferring exhaust heat to an engine coolant at the heat exchanger. In a first example of the method, the method for the engine includes during the cold start condition after the light-off, closing an exhaust gas recirculation (EGR) valve and flowing all of the exhaust drawn from downstream of the heat exchanger to the exhaust catalyst. A second example of the method optionally includes the first example and further includes wherein the cold-start condition includes an engine coolant temperature below a threshold coolant temperature. A third example of the method optionally includes one or more of the first and second examples, and further includes during an engine warmed-up condition, flowing a portion of exhaust drawn from the second exhaust valve of each engine cylinder to the heat exchanger, and flowing a remaining portion of exhaust drawn from the first exhaust valve of each engine cylinder to the exhaust catalyst. A fourth example of the method optionally includes one or more of the first through third examples, and further includes, during the engine warmed-up condition, flowing a first portion of exhaust drawn from downstream of the heat exchanger to an engine intake and flowing a remaining second portion of the portion of exhaust drawn from downstream of the heat exchanger to the exhaust catalyst. A fifth example of the method optionally includes one or more of the first through fourth examples, and further includes, wherein the engine warmed-up condition includes the engine coolant temperature at or above the threshold coolant temperature. A sixth example of the method optionally includes one or more of the first through fifth examples, and further includes, wherein a ratio of the first portion to the second remaining portion is based on desired EGR flow. A seventh example of the method optionally includes one or more of the first through sixth examples, and further includes, wherein the ratio increases as the desired EGR flow increases. An eighth example of the method optionally includes one or more of the first through seventh examples, and further includes, wherein during the engine warmed-up condition, if the desired EGR flow is zero, exhaust drawn from the first exhaust valve of each engine cylinder is delivered to the exhaust catalyst while bypassing a heat exchanger. A ninth example of the method optionally includes one or more of the first through eighth examples, and further includes, wherein flowing exhaust drawn from the first exhaust valve of each engine cylinder to the exhaust catalyst while bypassing a heat exchanger includes deactivating the second exhaust valve while maintaining the first exhaust valve active; and wherein flowing exhaust drawn from a second exhaust valve of each engine cylinder to the heat exchanger includes deactivating the first exhaust valve while maintaining the second exhaust valve active.

As another embodiment a method for an engine includes, during a first condition, before light-off of an exhaust catalyst and before a coolant temperature reaches a threshold coolant temperature, increasing exhaust flow from a first exhaust valve to the exhaust catalyst while decreasing exhaust flow from a second exhaust valve to a heat exchanger; during a second condition, after light-off of the exhaust catalyst and before the coolant temperature reaches the threshold coolant temperature, increasing exhaust flow from the second exhaust valve to the heat exchanger while decreasing exhaust flow from the first exhaust valve to the exhaust catalyst; and during a third condition, after light-off and when the coolant temperature reaches or increases above the threshold coolant temperature, directing a portion of exhaust flow to the exhaust catalyst bypassing the heat exchanger while directing a remaining portion of exhaust flow to the heat exchanger, the ratio of the portion of exhaust flow to the remaining portion of exhaust flow based on a desired EGR flow and cabin heating demand. In a first example of the method, the method for the engine includes during the third condition, delivering a first portion of the remaining portion from the heat exchanger to an intake manifold via an EGR valve while delivering a second portion of the remaining portion from the heat exchanger to exhaust catalyst; wherein the first portion is based on the desired EGR flow. A second example of the method optionally includes the first example and further includes wherein increasing exhaust flow from the first exhaust valve to the exhaust catalyst while decreasing exhaust flow from a second exhaust valve to a heat exchanger includes deactivating the second exhaust valve while maintaining the first exhaust valve active. A third example of the method optionally includes one or more of the first and second examples, and further includes wherein increasing exhaust flow from the second exhaust valve to the heat exchanger while decreasing exhaust flow from the first exhaust valve to the exhaust catalyst includes deactivating the first exhaust valve while maintaining the second exhaust valve active. A fourth example of the method optionally includes one or more of the first through third examples, and further includes, wherein directing a portion of exhaust flow to the exhaust catalyst bypassing the heat exchanger while directing a remaining portion of exhaust flow to the heat exchanger includes maintaining the first and the second exhaust valves active. A fifth example of the method optionally includes one or more of the first through fourth examples, and further includes, wherein the threshold coolant temperature is based on a desired cylinder head temperature and a vehicle cabin heating demand. A sixth example of the method optionally includes one or more of the first through fifth examples, and further includes, wherein during the third condition, if the desired EGR flow is zero, deactivating the second exhaust valve while maintaining the first exhaust valve active and closing an EGR valve.

As another embodiment a system includes an engine cylinder having a first exhaust valve and a second exhaust valve; a first exhaust manifold coupling the first exhaust valve to a first exhaust passage, the first passage directly coupled to a common exhaust passage including an exhaust catalyst; a second exhaust manifold coupling the second exhaust valve to a second separate exhaust passage; a heat exchanger located within the second exhaust passage; an EGR valve located within the second exhaust passage downstream of the heat exchanger; a return passage coupling the EGR valve to the common exhaust passage at a location upstream of the exhaust catalyst; and a controller with computer readable instructions for: responsive to a temperature of the exhaust catalyst below a light-off temperature, delivering exhaust gases from the cylinder to the exhaust catalyst via the first exhaust valve and the first exhaust manifold bypassing the heat exchanger; and responsive to the temperature reaching or increasing above the light-off temperature, if an engine coolant temperature is below a threshold, delivering exhaust gases from the cylinder to the heat exchanger via the second exhaust valve and the second exhaust manifold; otherwise, delivering a portion of exhaust gases from the cylinder to the exhaust catalyst via the first exhaust valve and delivering a remaining portion of exhaust gases from the cylinder to the heat exchanger via the second exhaust valve. In a first example of the system delivering exhaust gases from the cylinder to the exhaust catalyst via the first exhaust valve includes deactivating the second exhaust valve; wherein delivering exhaust gases from the cylinder to the heat exchanger via the second exhaust valve comprises deactivating the first exhaust valve; and wherein delivering the portion of exhaust gases from the cylinder to the exhaust catalyst via the first exhaust valve and delivering the remaining portion of exhaust gases from the cylinder to the heat exchanger via the second exhaust valve includes maintaining the first and the second exhaust valves active. A second example of the system optionally includes the first example and further includes wherein the controller includes further instructions for: responsive to the temperature reaching or increasing above the light-off temperature, if the engine coolant temperature is below the threshold, closing the EGR valve; otherwise adjusting an EGR valve position based on a desired EGR flow while maintaining the first and the second exhaust valves active.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
when the engine is operating in a cold start condition and during said cold start condition,
before light-off of an exhaust catalyst, flowing exhaust drawn from a first exhaust valve of each engine cylinder to the exhaust catalyst, via a first exhaust passage, while bypassing a heat exchanger in a second separate exhaust passage and deactivating a second exhaust valve of each engine cylinder; and
after light-off of the exhaust catalyst, flowing exhaust drawn from the second exhaust valve to the heat exchanger, via the second exhaust passage, while deactivating the first exhaust valve, and transferring exhaust heat to an engine coolant at the heat exchanger.

2. The method of claim 1, further comprising, during the cold start condition after light-off of the exhaust catalyst, closing an exhaust gas recirculation (EGR) valve and flowing all of the exhaust drawn from downstream of the heat exchanger to the exhaust catalyst.

3. The method of claim 1, wherein the cold start condition includes an engine coolant temperature below a threshold coolant temperature.

4. The method of claim 2, further comprising, during an engine warmed-up condition, flowing a portion of exhaust drawn from the second exhaust valve of each engine cylinder to the heat exchanger, and flowing a remaining portion of exhaust drawn from the first exhaust valve of each engine cylinder to the exhaust catalyst.

5. The method of claim 4, further comprising, during the engine warmed-up condition, flowing a first portion of a portion of exhaust drawn from downstream of the heat exchanger to an engine intake and flowing a remaining second portion of the portion of exhaust drawn from downstream of the heat exchanger to the exhaust catalyst.

6. The method of claim 5, wherein the engine warmed-up condition includes an engine coolant temperature at or above a threshold coolant temperature.

7. The method of claim 5, wherein a ratio of the first portion of exhaust to the remaining second portion of exhaust is based on a desired EGR flow.

8. The method of claim 7, wherein the ratio increases as the desired EGR flow increases.

9. The method of claim 7, wherein during the engine warmed-up condition, if the desired EGR flow is zero, exhaust drawn from the first exhaust valve of each engine cylinder is delivered to the exhaust catalyst while bypassing the heat exchanger.

10. The method of claim 1, wherein flowing exhaust drawn from the first exhaust valve of each engine cylinder to the exhaust catalyst while bypassing the heat exchanger includes deactivating the second exhaust valve while maintaining the first exhaust valve active; and wherein flowing exhaust drawn from the second exhaust valve of each engine cylinder to the heat exchanger includes deactivating the first exhaust valve while maintaining the second exhaust valve active.

11. A method for an engine, comprising:
during a first condition, before light-off of an exhaust catalyst and before a coolant temperature reaches a threshold coolant temperature, increasing exhaust flow from a first exhaust valve of each engine cylinder to the exhaust catalyst while decreasing exhaust flow from a second exhaust valve of each engine cylinder to a heat exchanger;
during a second condition, after light-off of the exhaust catalyst and before the coolant temperature reaches the threshold coolant temperature, increasing exhaust flow from the second exhaust valve to the heat exchanger while decreasing exhaust flow from the first exhaust valve to the exhaust catalyst; and
during a third condition, after light-off and when the coolant temperature reaches or increases above the threshold coolant temperature, directing a portion of exhaust flow to the exhaust catalyst bypassing the heat exchanger while directing a remaining portion of exhaust flow to the heat exchanger, a ratio of the portion of exhaust flow to the remaining portion of exhaust flow based on a desired EGR flow and cabin heating demand.

12. The method of claim 11, further comprising, during the third condition, delivering a first portion of the remaining portion from the heat exchanger to an intake manifold via an EGR valve while delivering a second portion of the remaining portion from the heat exchanger to the exhaust catalyst, wherein the first portion is based on the desired EGR flow.

13. The method of claim 11, wherein increasing exhaust flow from the first exhaust valve to the exhaust catalyst while decreasing exhaust flow from the second exhaust valve to the heat exchanger includes decreasing a second exhaust valve lift amount of the second exhaust valve while increasing a first exhaust valve lift amount of the first exhaust valve.

14. The method of claim 11, wherein increasing exhaust flow from the second exhaust valve to the heat exchanger while decreasing exhaust flow from the first exhaust valve to the exhaust catalyst includes decreasing a first exhaust valve lift amount while increasing a second exhaust valve lift amount.

15. The method of claim 11, wherein directing the portion of exhaust flow to the exhaust catalyst bypassing the heat exchanger while directing the remaining portion of exhaust flow to the heat exchanger includes increasing first and second exhaust valve lift amounts.

16. The method of claim 11, wherein the threshold coolant temperature is based on a desired cylinder head temperature and a vehicle cabin heating demand.

17. The method of claim 11, wherein during the third condition, if the desired EGR flow is zero, decreasing a second exhaust valve lift amount while increasing a first exhaust valve lift amount and closing an EGR valve.

18. A system comprising:
an engine cylinder having a first exhaust valve and a second exhaust valve;
a first exhaust manifold coupling the first exhaust valve to a first exhaust passage, the first passage directly coupled to a common exhaust passage including an exhaust catalyst;
a second exhaust manifold coupling the second exhaust valve to a second separate exhaust passage;
a heat exchanger located within the second exhaust passage;
an EGR valve located within the second exhaust passage downstream of the heat exchanger;
a return passage coupling the EGR valve to the common exhaust passage at a location upstream of the exhaust catalyst; and
a controller with computer readable instructions for:
responsive to a temperature of the exhaust catalyst below a light-off temperature before the catalyst achieves light-off, delivering exhaust gases from the cylinder to the exhaust catalyst via the first exhaust valve and the first exhaust manifold bypassing the heat exchanger;
responsive to the temperature reaching or increasing above the light-off temperature, if an engine coolant temperature is below a threshold, delivering exhaust gases from the cylinder to the heat exchanger via the second exhaust valve and the second exhaust manifold; otherwise, delivering a portion of exhaust gases from the cylinder to the exhaust catalyst via the first exhaust valve and delivering a remaining portion of exhaust gases from the cylinder to the heat exchanger via the second exhaust valve; and
responsive to the temperature decreasing below the light-off temperature after the catalyst achieves light-off, if the engine coolant temperature is below the threshold, delivering exhaust gases from the cylinder to the heat exchanger via the second exhaust valve and the second exhaust manifold.

19. The system of claim 18, wherein delivering exhaust gases from the engine cylinder to the exhaust catalyst via the first exhaust valve includes deactivating the second exhaust valve; wherein delivering exhaust gases from the cylinder to the heat exchanger via the second exhaust valve comprises deactivating the first exhaust valve; and wherein delivering the portion of exhaust gases from the cylinder to the exhaust catalyst via the first exhaust valve and delivering the remaining portion of exhaust gases from the cylinder to the heat exchanger via the second exhaust valve includes maintaining the first and second exhaust valves active.

20. The system of claim 18, wherein the controller includes further instructions for:
responsive to the temperature reaching or increasing above the light-off temperature, if the engine coolant temperature is below the threshold, closing the EGR valve; otherwise, adjusting an EGR valve position based on a desired EGR flow while maintaining the first and second exhaust valves active.

* * * * *